United States Patent
Yadav et al.

(10) Patent No.: US 11,899,538 B2
(45) Date of Patent: Feb. 13, 2024

(54) STORAGE INTEGRATED DIFFERENTIAL BLOCK BASED BACKUP

(71) Applicant: Dell Products L.P., Round Rock, TX (US)

(72) Inventors: Sunil Yadav, Bangalore (IN); Shelesh Chopra, Bangalore (IN); Ravi Chitloor, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 68 days.

(21) Appl. No.: 17/563,022

(22) Filed: Dec. 27, 2021

(65) Prior Publication Data

US 2023/0205636 A1  Jun. 29, 2023

(51) Int. Cl.
*G06F 16/23* (2019.01)
*G06F 11/14* (2006.01)

(52) U.S. Cl.
CPC .......................... *G06F 11/1448* (2013.01)

(58) Field of Classification Search
CPC ............ G06F 11/1451; G06F 11/1469; G06F 11/1448; G06F 16/2358; G06F 16/178; G06F 16/128; G06F 16/2237
See application file for complete search history.

(56) References Cited

U.S. PATENT DOCUMENTS

| | | | |
|---|---|---|---|
| 8,229,896 B1 | 7/2012 | Narayanan | |
| 8,849,878 B1 | 9/2014 | Bachu | |
| 8,918,366 B2 | 12/2014 | D'souza | |
| 9,507,673 B1 | 11/2016 | Rangapuram | |
| 10,067,952 B2 | 9/2018 | Ahrens | |
| 10,146,630 B1 * | 12/2018 | Kumar | G06F 16/2237 |
| 10,459,632 B1 | 10/2019 | Chen | |
| 11,256,720 B1 | 2/2022 | Hoffman | |
| 2006/0053182 A1 | 3/2006 | Sen | |
| 2010/0077165 A1 | 3/2010 | Lu | |
| 2015/0142748 A1 * | 5/2015 | Gottemukkula | G06F 11/1461 707/649 |
| 2018/0032404 A1 | 2/2018 | Komatsu | |
| 2018/0322019 A1 | 11/2018 | Stowell | |
| 2020/0356450 A1 | 11/2020 | Littlefield | |
| 2021/0117278 A1 | 4/2021 | Yadav | |
| 2023/0098965 A1 | 3/2023 | Falkinder | |

* cited by examiner

*Primary Examiner* — Apu M Mofiz
*Assistant Examiner* — Cindy Nguyen
(74) *Attorney, Agent, or Firm* — Staniford Tomita LLP

(57) ABSTRACT

A changed block tracking (CBT) driver at a production host tracks, in a bitmap, changes made to a source volume of the production host since a last backup. A command is received to perform a differential backup of the source volume. A request is issued to a copy service to take a snapshot of the source volume. The bitmap is embedded into the snapshot. The snapshot is mounted on a backup proxy, different from the production host. The backup proxy retrieves the bitmap from the snapshot and conducts the differential backup of the source volume to secondary storage, thereby backing up the changes made to the source volume since the last backup according to the bitmap.

19 Claims, 14 Drawing Sheets

Merge a backup chain including an incremental backup of a source volume into a full backup of the volume to create a synthetic full backup of the volume, the full backup corresponding to a state of the volume at a first time, and the synthetic full backup corresponding to a state of the volume at a second time, after the first time
1010

Retrieve a bitmap that was embedded into a snapshot of the source volume, the snapshot having been taken at the second time for the incremental backup, and the bitmap identifying data from the source volume copied to secondary storage for creation of the incremental backup
1015

Regenerate the backup chain by copying from the snapshot the data identified by the bitmap to a regenerated incremental backup
1020

FIG. 10

Upon a backup chain of a synthetic full backup being regenerated, identify an incremental backup in the backup chain after which the backup chain should be cut
1110

Merge remaining incremental backups in the backup chain into a full backup to generate another synthetic full backup that excludes incremental backups cut from the backup chain
1115

US 11,899,538 B2

STORAGE INTEGRATED DIFFERENTIAL BLOCK BASED BACKUP

CROSS-REFERENCE TO RELATED APPLICATIONS

The present application is related to U.S. patent application Ser. No. 17/563,036, filed Dec. 27, 2021; Ser. No. 17/563,042, filed Dec. 28, 2021; and Ser. No. 17/563,046, filed Dec. 28, 2021, all assigned to the assignee of the present application, and each incorporated herein by reference in its entirety.

TECHNICAL FIELD

Embodiments are generally directed to information processing, and more specifically to performing and recovering backups.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Organizations depend on having ready access to their data. Data, however, can be lost in a variety of ways such as through disasters and catastrophes (e.g., fires or flooding), media failures (e.g., disk crash), computer viruses, accidental deletion, and so forth. It is important that the data be backed up. An organization may have an immense amount of data that is critical to the organization's operation. Backing up data and subsequently recovering backed up data, however, can involve lengthy times and large amounts of computing resources such as network bandwidth, processing cycles, and storage due to the complexity and amount of data to be backed up.

There have been many advances to improve backup and recovery operations. For example, a backup proxy can be used to offload backup processes from a production server. This allows the production server to remain dedicated to servicing production requests while the backup proxy conducts the actual rollover of data to backup storage. As another example, incremental backups can reduce or limit the amount of data included in a backup to changes since a last backup. Trackers at a production host can monitor for changes so that only the changes are backed up in a current backup. This can decrease the amount of time and compute resources required to conduct a backup. As another example, synthetic full backups can be used to decrease recovery times. A synthetic full backup combines one or more incremental backups into a previous full backup. Recovery can then be achieved by applying the single synthetic full backup to the host to be recovered instead of having to apply the previous full backup and each incremental backup.

Nonetheless, there remains a continuing demand to further reduce backup window times, increase efficiencies, and provide flexible recovery options all while ensuring that no data corruption errors have been introduced during the backup process and related operations. For example, while incremental backups can reduce backup window times and required storage space, backup proxies generally cannot take advantage of incremental backups because they are outside of the production input/output (TO) data path that is occurring at the production server. As another example, there is a need to help ensure that any data corruption errors introduced during the backup and other related processes are quickly identified so that the issue can be addressed at the time of the backup rather being discovered at a much later date when there is a need to restore the backup.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 10A shows an example of a full backup and a chain of incremental backups along with snapshots and embedded bitmaps being maintained on secondary storage, according to one or more embodiments.

FIG. 10B shows an example of merging the chain of incremental backups in the full backup to create a synthetic full backup, according to one or more embodiments.

FIG. 10C shows an example of regenerating the chain of incremental backups, according to one or more embodiments.

DETAILED DESCRIPTION

Figure 1:
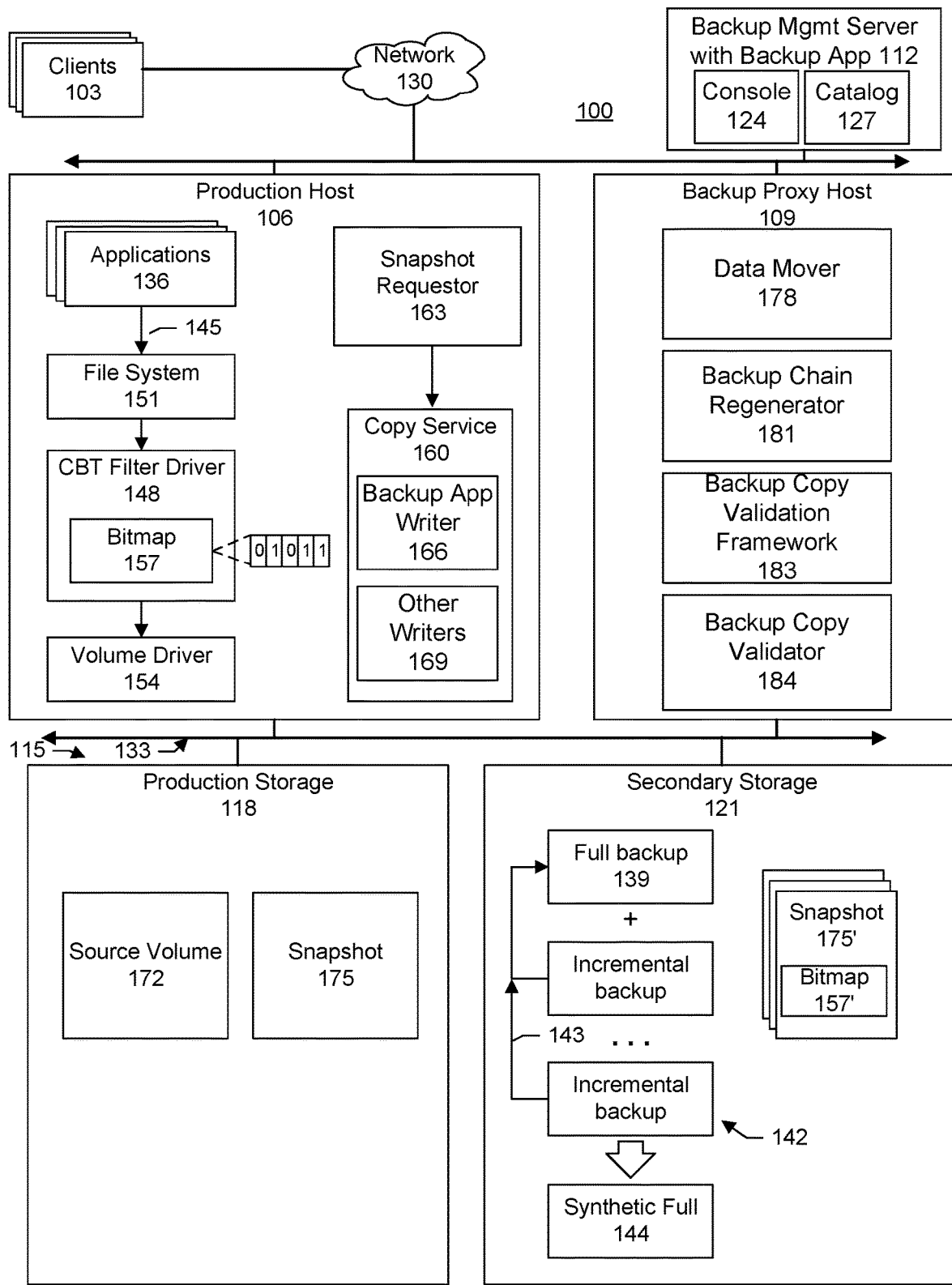
FIG. 1 shows a block diagram of a large-scale network implementing a data protection system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a non-transitory computer-readable storage medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for protecting and recovering data. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a data protection backup system. The system includes a set of clients 103, production host 106, backup proxy host 109, backup management server with backup application 112, and storage system 115 including primary or production storage 118 and secondary or backup storage 121. The backup management server includes a management console 124 and a backup catalog 127.

A network 130 allows the clients to access the services and applications hosted by the production host. The hosts may be general purpose computers or servers with hardware and software. The hosts may include, for example, a processor, memory, applications, file system, operating system, and the like. The hosts execute executable code (or computer-readable code) that embodies a technique or algorithm as described herein. An interconnect 133 connects the production and backup proxy hosts to the storage system. The interconnect may include a bus, a connection over a network such as a storage area network (SAN), or any other connection scheme to communicatively connect to the storage system. It should be appreciated that the blocks shown in FIG. 1 can be functional entities and there can be many different configurations. One or more individual blocks may exist as separate code modules. Alternatively, two or more blocks may be combined into a single code module. The various modules of the system may be implemented at any level such as at the application level, operating system level, and so forth. Although FIG. 1 shows a single production and backup proxy host, it should be appreciated that there can be any number of production and backup proxy hosts. For example, there can be a cluster of production hosts, a cluster of backup proxy hosts, or both.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The management console provides a user interface to the backup system that allows a user, such as a backup administrator, to schedule backups, identify data sources to be backed up, set retention durations, and configure other backup options. The backup catalog provides an index of the data stored in secondary or backup storage. The catalog may include metadata associated with a backup such as a time and date of a backup, backup type (e.g., full, incremental, or synthetic full), an identification of the backup source (e.g., production host identifier), a manifest (e.g., listing of components associated with a particular backup), information required for restoring or recovering a backup, an identification of the files stored in a particular backup at secondary storage, and so forth. Mapping information may be stored that maps blocks that have been backed up to the corresponding files that they belong to.

The storage system may include a pool of storage devices including storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The production host server may host any type of large or distributed application 136 such as Microsoft Exchange or SQL Server as provided by Microsoft Corporation of Redmond, Washington. The application supports and processes requests from the clients. Production data of the application is stored in production storage. The backup management server is responsible for overall management of backups from production to secondary or backup storage by coordinating with backup components of the backup application that may be distributed across the production and backup proxy host servers. The backups are secondary copies that can be used in the event that primary copies at the production location become unavailable due to, for example, data corruption, accidental deletion, natural disaster, data breaches, hacks, or other data loss event. The backups may be stored in a format such as a compressed format, deduplicated format, or encrypted format that is different from the native source format. For example, in deduplicated storage, the storage system maintains metadata that allows two or more files to reference a same data block.

Enterprises rely on backup and recovery software products to backup and recover data. It is important that backups be conducted on a regular basis so as to help ensure minimal disruption if the enterprise suffers a data loss event. Data can be lost through accidental deletion, system outage, hardware failure, malicious attack, or other catastrophic event. Generally, a backup involves copying and archiving the data, e.g., creating and saving a backup image to secondary or backup storage media, so that the data is available for restore should the primary copy of the data at the production site become lost or corrupted.

There are several different types of backups including full backups, incremental backups, file-based backups (FBB), and block-based backups (BBB). A full backup backups data on a volume regardless of whether or not the data has changed since a last backup. An incremental backup backs up changes since the last backup while excluding data that has not changed. An incremental backup may be referred to as a differential backup.

File-based backups involve reading the logical file system present at the source location to backup data on a file-by-file basis. The granularity of a file-based backup is thus at the level of the individual files. In a block-based backup (BBB), rather than backing up file by file, blocks are read directly from the volume. A block-based backup is thus at a level lower than a file-based backup. A block-based backup can be used to backup blocks of a file that have changed while excluding from the backup blocks of the file that have not changed. A size of a block may range from about 64 KB to about several megabytes in size, e.g., 128 KB, 254 KB, 512 KB, 1 MB, 2 MB, 3 MB, and so forth.

An initial backup of the production site may be a full backup 139 followed by one or more differential or incremental backups 142 that are chained, linked, or associated 143 with the full backup by the backup application. A typical backup strategy may include a mix of full and incremental backups where, for example, full backups are made on a weekly basis while incremental backups are made on a daily basis. A backup may be referred to as a saveset and may be stored as an image, container, or virtual hard disk.

Generally, restoring the production source volume to a particular point in time involves copying backed up blocks from secondary storage to the production source volume from the most recent full backup made before the particular point in time, and then copying blocks from secondary storage to the production source volume from each incremental backup made between the time of the full backup and the particular point in time. These backups are copied successively to the source volume in chronological order of the backups, beginning with a full restoration of the source volume with the full backup, and ending with the copying of blocks from the incremental backups.

Recovering a source volume by restoring a full backup and then applying incremental backups up to the point of time at which a recovery is desired, however, can require a lengthy amount of time to complete especially when multiple incremental backups need to be applied. The time to copy data from secondary storage to the volume increases with the size of data and thus increases recovery time objectives (RTOs). Further, each incremental backup maintained and tracked on secondary storage adds overhead and administrative costs.

Thus, in order to reduce recovery times and decrease the overhead involved with managing and maintaining incremental backups, one or more incremental backups may be merged into a previous full backup on secondary storage to generate a synthetic full backup 144. This type of backup is referred to as "synthetic" because it is generated on secondary storage. That is, a synthetic full backup refers to creating a "full" backup on the backend (e.g., secondary storage) by merging or consolidating a full backup (e.g., a parent virtual hard disk) and one or more incremental backups (e.g., one or more child virtual hard disks) following the full backup.

For example, the merge process may include identifying a full backup at secondary storage and applying in chronological order the one or more incremental backups to the full backup at secondary storage. Depending upon factors such as the amount of storage space available and customer requirements, a synthetic full backup can be created without altering the previous backup copies. Preserving the full backup, incremental backups or both can provide for intermediate recoveries. Alternatively, the full backup, incremental backups, or both may not be preserved after the merge process. Maintaining the full backup, incremental backups, or both consumes storage, management, and administrative overhead resources. Thus, in an embodiment, the full backup, incremental backups, or both are not preserved after the merge process.

Any number of incremental backups may be merged into a full backup to create a synthetic full backup. For example, there can be one, two, three, four, five, or more than five incremental backups merged into a full backup to create a synthetic full backup. Depending on the amount of storage, compute resources, customer objectives, and other factors, a synthetic full backup may be performed once a threshold number of incremental backups have been made, on demand, or on the fly in conjunction with each incremental backup. For example, synthetic full backups may be performed on a weekly basis in which incremental backups created throughout a week are merged at an end of the week into a full backup performed at a beginning of the week. Alternatively, a synthetic full backup may be performed as soon as, contemporaneously with, or in conjunction with performing an incremental backup. In this embodiment, the synthetic full backup includes original unchanged blocks from a previous full backup and changed or new blocks from a current incremental backup.

Block-based backups for full and incremental backups are popular for both volume-level filesystems and file-level for applications. One example of an application in which block-based backups may be used is Microsoft Exchange. Generally, backups are performed from the production servers. The required backup software is installed on the server. The block-based backup software includes a driver that is installed at the production host. The driver may be referred to as a changed block tracker (CBT), block-based backup (BBB), or filter driver. The driver tracks and monitors changes in the filesystem. Changes can include writes that modify existing data and writes that add new data. When a backup is to be conducted, other backup components query or request the changes from the driver and roll over the data to backup storage. This works well for many customers who have standalone hosts, servers, and applications.

A computing environment may include a backup proxy host that is a separate or different computing node from the production host to assist with the backup. In some cases, there can be a very large amount of data to backup, e.g., multiple terabytes (TBs), that may require an entire day or more to backup. In such cases, having a backup proxy host to assist can be very beneficial as compute resources associated with backup jobs and tasks may be offloaded from the production host to the backup proxy host. This allows the production host to remain dedicated to servicing production requests while the backup proxy host conducts the actual backup or data rollover portion of the backup.

To facilitate backups, a backup application may use snapshots to conduct backups of data from production storage to backup storage. A snapshot includes a set of reference markers or pointers to data on a storage device (e.g., disk drive, disk array, storage array, or storage area network (SAN)). Snapshots are instantaneous or near-instantaneous virtual copies of a volume capturing the data or state of the volume as it appeared at a time the snapshot was taken.

Figure 2:
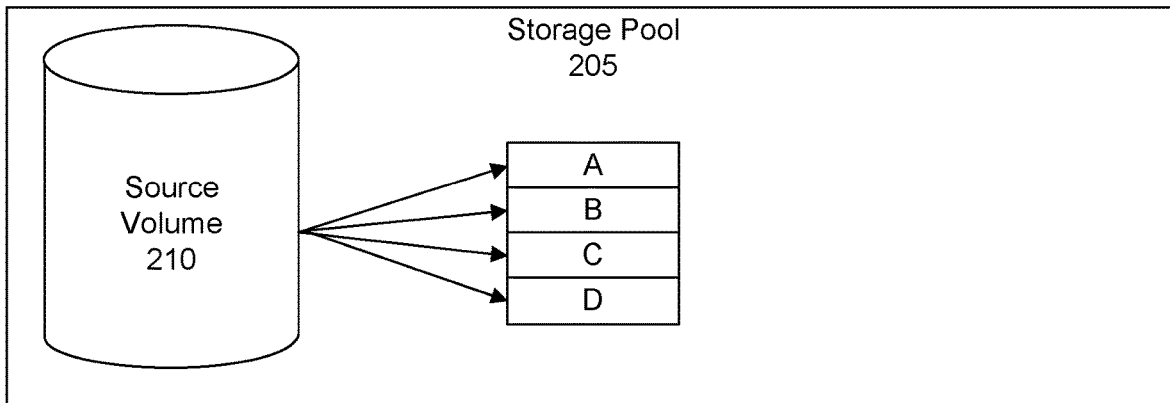
FIG. 2 shows a block diagram of a storage pool having a source volume, according to one or more embodiments.
Figure 3:
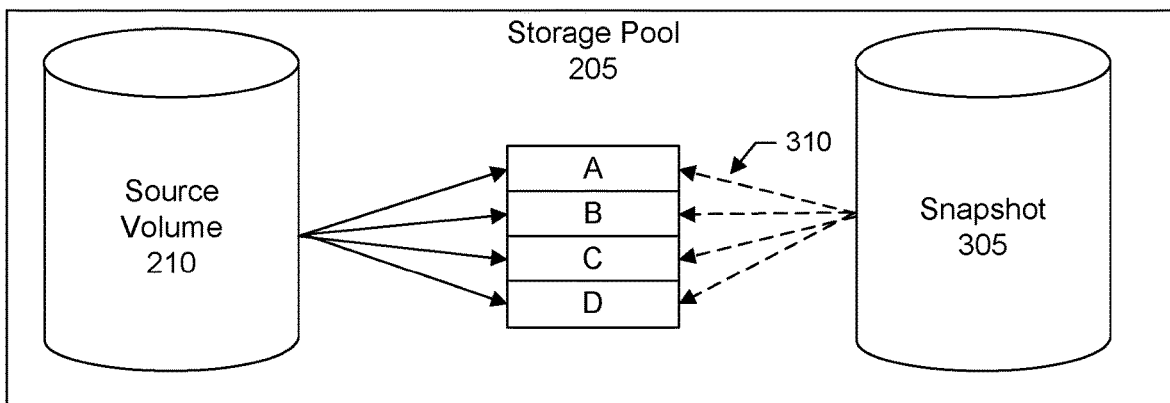
FIG. 3 shows a block diagram of a snapshot having been taken of the source volume, according to one or more embodiments.
Figure 4:
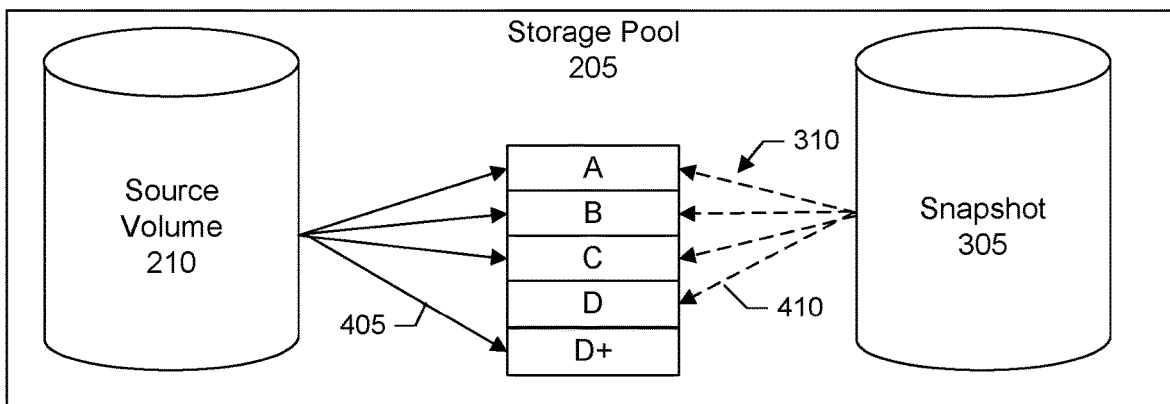
FIG. 4 shows a block diagram of an operation of the snapshot, according to one or more embodiments.

There are many different ways to create a snapshot. For example, FIGS. 2-4 show examples of a redirect-on-write (ROW) snapshot operation. With redirect-on-write, new writes to snapped storage resources or their snapshots are redirected to a new location in the same storage pool, and pointers are updated to point to the new location. Specifically, FIG. 2 shows a first state of a storage pool 205 having a source volume 210 with data blocks A-D. FIG. 3 shows a second state, after the first state, of the storage pool in which a snapshot 305 has been taken of the volume. The snapshot includes pointers 310 to blocks A-D. FIG. 4 shows a third state, after the second state, of the storage pool when a write has been issued by a host that attempts to overwrite block D with new data, e.g., D+. As shown in the example of FIG. 4, new data D+ is written to a new location in the same storage pool and a pointer 405 of the source volume is updated to point to block D+. The snapshot, however, continues to point 410 to original block D thereby preserving the original data.

Another example of a snapshot technique is copy-on-write (COW). In order to preserve the snapped data, copy-on-write snapshots copy blocks to a designated protection space or storage area prior to being overwritten.

Snapshots allow backups to be conducted with little interruption to operations of a production host. Snapshots can be created very quickly because they are virtual rather than actual copies of data. For example, the time required to create or take a snapshot can be on the order of about 10 seconds. Once a snapshot has been taken of a source volume a production host can resume production operations (e.g., writes) to the source volume as the snapshot will preserve the data or state of the volume as of the time of the snapshot. The snapshot can then be mounted and read in order to make actual copies of the data blocks of the source volume to secondary storage while the production host continues to make production writes to the source volume.

In other words, customers of a backup application may use various snapshotting technologies on the production servers, mount these snapshots on the proxies and perform data rollovers from there. The use of backup proxies free up the production servers immediately once the snapshotting is done. Hence, customers' production servers are not impacted by the rollover which could be running for hours, sometimes even for days.

Backup proxies, however, are unable to conduct incremental or differential backups because they are outside of the input/output (IO) path of the production requests issued by the clients to the production hosts. Thus, a backup proxy, unlike a production host with its CBT driver, is not able to track or monitor changes between backups. A typical backup proxy does not include the components for block-based backups. Indeed, it is at the production host where production changes occur and thus can be tracked by the driver at the production host. As a result, when a snapshot is mounted at a backup proxy, the backup proxy is unaware of what changes have been made since a last backup. Hence, the backup proxy will perform a full backup from the snapshot.

There do exist snapshot differencing engines, e.g., snapdiffs, which can identify differences between two snapshot copies in which case the differences could be transported to the proxies for incremental backups. Not all storage arrays, however, support snapdiffs. There is a need to be able to conduct differential or incremental backups from a backup proxy regardless of what type of storage array is being used. Also, when there is a requirement to mount a snapshot (e.g., a hardware snapshot) of a host/server to a proxy server, snapdiffs are not available or supported.

In such scenarios and others, there is a need to efficiently backup data from proxies. Repeatedly performing full backups is not always desirable due to recovery point objectives (RPOs), various business requirements, and other considerations. If a backup is conducted from the production host itself, both full and incremental backups are supported because the CBT or BBB driver installed at the production host is tracking the changes on the production host. When, however, the snapshot is mounted to a different host (e.g., backup proxy) and snapdiff is not supported, there is the problem of finding the changes since a previous snapshot or backup.

Full backups generally require longer backup windows and consume more storage space and resources as compared to incremental or differential backups. Backups from the backup proxies result in longer backup windows because every backup is performed as a full backup. As discussed, the reason is because a BBB driver on the proxy cannot track the changes as the proxy is outside the IO paths of the production hosts. In other words, every time a new snapshot is mounted such an activity does not flush any data through the filter driver. For any filter driver to capture the delta, the data needs to be flushed from the user space. This is not the case when a snapshot is mounted on a proxy.

File-based backups (FBB) do not sufficiently address the issue in cases where there are large amounts of data, but relatively few files. For example, customers may have applications such as SQL or Exchange which have large databases. Generally, databases store data in few but very large files. File-based backups backup at the granularity of individual files. A file-based backup cannot limit backups to only changed regions in a file. Rather, a file-based backup backups up the entire file again and again even if only a small region of the file has changed between backups.

In an embodiment, a technique involves leveraging the BBB mechanism, which operates on the production server, to proxies where the BBB driver is not installed. As discussed, even if the BBB is installed at the proxy, the BBB driver cannot track the changes because although the snapshot is mounted at the proxy, the IOs do not occur on this snapshot so any BBB driver at the proxy is not able to track what is changing. In this embodiment, systems and techniques are provided to improve proxy-based backups by providing the same filtering information to the proxy. Rather than repeatedly create full backups more optimized techniques are used to improve backup speeds and bandwidth usage (e.g., fastcopy and overwrite). In this embodiment, changes are tracked in the driver at the production host. The changes are provided to the backup proxy host which is then responsible for the rollover of the changes to secondary storage.

To illustrate the changed block tracking or BBB mechanism, FIG. 1 shows a path of IOs, e.g., writes, 145 from the hosted applications. A changed block tracking filter driver 148 is located between a file system 151 of the production host and a volume driver 154. The filter driver is an operating system (OS) driver module that monitors and tracks writes issued to the source volume by the production host. In an embodiment, the filter driver maintains a changed block map that tracks changes to the source volume between backups. In an embodiment, the changed block map includes a bitmap 157. In an embodiment, changes are tracked at a 64-bit level. That is, a unit of the change tracking is 64K. Each bit in the bitmap is 64K. It should be appreciated, however, that changes may be tracked at other levels of granularity.

More specifically, after a full backup has been made there can be a series of incremental backups. Each incremental backup includes only blocks of data that have changed in the source volume since the previous backup. Each incremental backup also identifies all of the changed blocks. The incremental backup includes a changed block map that identifies the changed blocks.

As discussed, in an embodiment, the changed block map includes a bitmap identifying locations or addresses on the source volume having changed data. Each block of a volume has an address identifying its location. Each block change on the production volume is accompanied with a look into the bitmap to set a corresponding flag indicating that the respective block has changed. A bitmap is a type of data structure that provides a mapping of Boolean information for a large domain into a compact representation. The bitmap includes a bit for each block of the source volume mapped to particular location or address. A bit set to 0 may indicate that the block is the same since the previous backup. A bit set to 1 may indicate that the block has changed since the previous backup.

For example, a bitmap of "01011" indicates that a first block of the source volume has not changed, a second block has changed, a third block has not changed, a fourth block has changed, a fifth block has changed, and so forth. After each backup or snapshot taken of the source volume, the bitmap or other changed block map may be reset in order to track any following changes to the source volume for a next backup. In another embodiment, the changed block map includes an extent map. The extent map includes entries for extents of contiguous blocks of data that have changed in the source volume since the previous backup. Each extent entry may include an offset and length for a corresponding extent to identify a location on the source volume having changed data.

In an embodiment, backups are performed in conjunction with a copy service 160. The copy service may be referred to as a volume snapshot service or shadow copy service. When a determination or request is received to make a backup, a snapshot requestor 163 of the backup application interfaces with the copy service to request a snapshot. In an embodiment, the copy service is the Microsoft Volume Shadow Copy Service (VSS) as provided by Microsoft Corporation. Copy services such as VSS facilitate the creation of a snapshot of a volume. A snapshot of a volume may be referred to as a point-in-time copy, shadow copy, or virtual volume. Once a snapshot has been created, a data mover of the backup application can copy data from the snapshot to backup storage in a process referred to as a rollover and thus create a backup image of the volume.

The VSS framework includes a set of component object model (COM) application programming interfaces (APIs) that provide standardized interfaces for third-party backup and restoration products to centrally manage the backup and restore operations on a variety of applications. VSS allows volume backups to be performed while applications on a production host continue to write to the source volume. Generally, VSS includes three components including a requestor, provider, and writer. The requestor refers to the application that requests the creation of a shadow copy, e.g., snapshot. The provider refers to the interface that provides the functionality to actually make the shadow copy. The writer is the application-specific software that acts to ensure that application data is ready for shadow copy creation.

Requestors, providers, and writers communicate in the VSS framework to create and restore volume shadow copies. A shadow copy of a volume "duplicates" all the data held on that volume at a particular point in time. A requestor initiates the backup and restore processes. The provider controls the processes and instructs a writer to prepare a dataset for backup. When everything is ready, a requestor then instructs a provider to create a shadow copy. A requester can be any application, such as a backup application, that uses the VSS API to request the services of the VSS service to create and manage shadow copies and shadow copy sets of one or more volumes. In addition to initiating shadow copies, the backup application communicates with writers to gather information on the production host and to signal writers to prepare their data for backup.

The copy service, e.g., VSS, helps to provide a consistent image of a dataset to ensure a logically consistent backup. For example, in many cases, it would be desirable to perform a backup while the production host remains available (e.g., while there may be open files that are being written to) in order to reduce or minimize the amount of downtime. Modifying data while a backup job is running, however, can result in a corrupted backup. The VSS copy service helps to ensure, among other things, that a VSS-enabled application (e.g., Exchange, or SQL Server) is properly quiesced or brought to a consistent state in order to create a snapshot.

In an embodiment, the copy service includes components including a backup application writer 166 and other writers 169. The writers help to ensure logically-consistent open file backups. There may be a writer for each application to be backed up. For example, there may be an Exchange Writer, SQL Server Writer, and so forth. Each writer is aware of where its corresponding application stores its data. More specifically, a writer may be responsible for functions such as quiescing the corresponding application and data stores to be backed up (e.g., temporarily freezing application I/O write requests) and flushing the cache for snapshot generation, and thawing the application and data stores after the snapshot is generated. A writer may further create or facilitate the creation of a description of the backup components, a data restoration process, or both. The information can be used by the backup application to determine how to backup and restore or recover the data.

In an embodiment, a backup application writer is provided with the backup application and is responsible for embedding a bitmap identifying changed blocks into a corresponding snapshot that is to be backed up to secondary storage along with the blocks. Further discussion is provided below.

The example shown in FIG. 1 includes a block-based backup system that includes three major components, each playing a certain role in in the overall data protection scheme: (1) snapshotting using the copy service (e.g., Volume Shadow Copy Services (VSS)); (2) filter driver; and (3) data mover. In an embodiment, these components work in tandem and are distributed across the production host and the backup proxy host rather than all being installed on the same host. These components are leveraged in a distributed fashion to achieve differential or incremental backups from the proxies without losing any benefits of block-based backups. The technique does not introduce any impact on the production servers. Data rollover is performed by the proxies; however, differential or incremental rollovers are provided for thereby reducing the backup windows for all data protection activities be it applications or filesystems.

Figure 5:
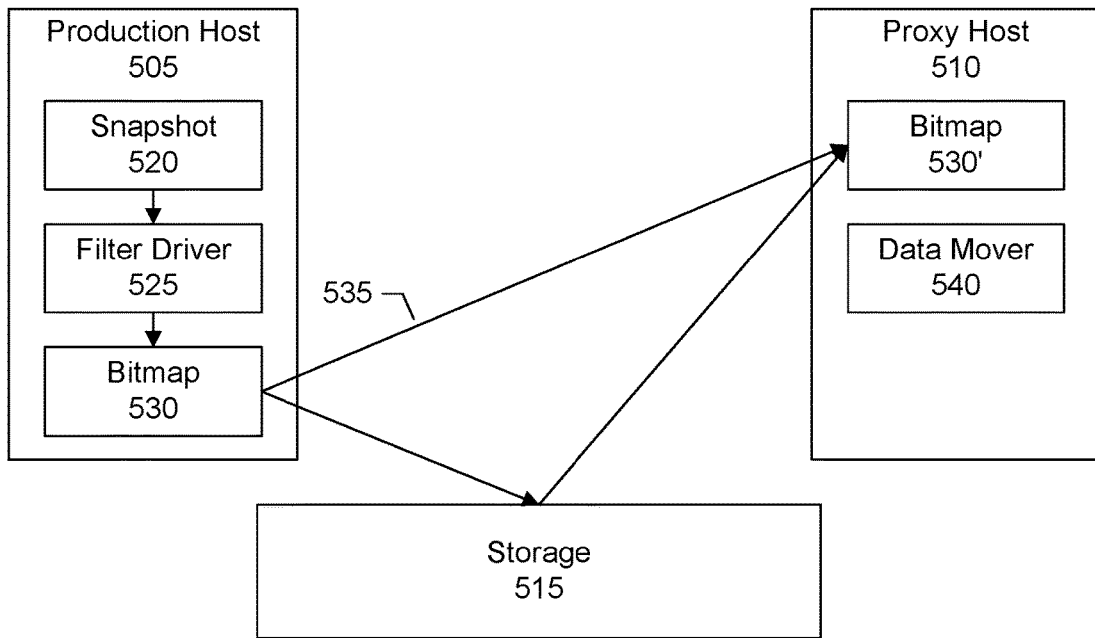
FIG. 5 shows a block diagram of using a bitmap embedded into a snapshot to allow differential backups by a backup proxy, according to one or more embodiments.

FIG. 5 shows a simplified block diagram for an integrated and distributed block-based backup. As shown in the example of FIG. 5, there is a production host 505, backup proxy host 510, and storage 515. At the production host, there is a snapshot 520, CBT filter driver 525, and bitmap 530. The filter driver, however, is absent, not present, or not installed at the proxy host. As part of a backup, the bitmap is provided or sent 535 to the backup proxy host. The sent bitmap (shown in FIG. 5 as bitmap 530') allows a data mover 540 at the backup proxy host to conduct a differential backup.

Figures 6, 7, 8:
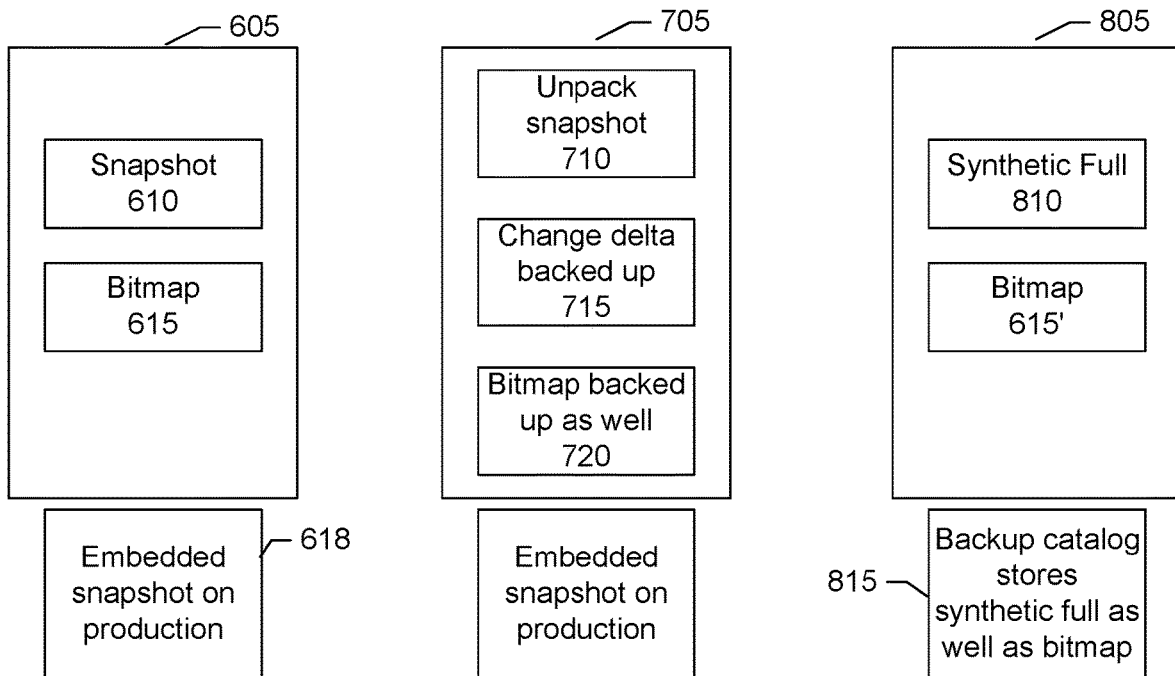
FIG. 6 shows a block diagram of a first step of embedding a bitmap into a snapshot, according to one or more embodiments.
FIG. 7 shows a block diagram of a second step of embedding a bitmap into a snapshot, according to one or more embodiments.
FIG. 8 shows a block diagram of a third step of embedding a bitmap into a snapshot, according to one or more embodiments.

FIGS. 6-8 show a set of steps for backing up using bitmaps embedded into snapshots. In a first step 605 of FIG. 6, there is a snapshot 610 and bitmap 615. The snapshot is embedded with the bitmap on the production host 618. In a second step 705 of FIG. 7, the snapshot is unpacked (710), change deltas are backed up according to the bitmap (715), and the bitmap (along with snapshot) are backed up as well (720). In a third step 805 of FIG. 8, a synthetic full 810 may be generated at backup storage. The bitmap (shown in FIG. 8 as bitmap 615') is also maintained at backup storage. The backup catalog stores or tracks the synthetic full backup as well as the bitmaps (815).

Referring back now to FIG. 1, in brief, a backup of a source volume 172 at the production host to which production data is written is initiated by the snapshot requestor issuing a request to a copy service for generation of a snapshot 175. Upon the snapshot being generated, the backup application writer retrieves the bitmap tracking changed blocks to the source volume from the filter driver and embeds the bitmap into the snapshot. That is, the bitmap is copied to the snapshot. In an embodiment, the embedding of the bitmap into the snapshot occurs during a brief window of time (e.g. about 10 seconds) that begins when a snapshot is requested and ends once the snapshot is taken, but before the snapshot is made read-only. In an embodiment, a method may include receiving a notification at a volume shadow copy service (VSS) writer indicating that a snapshot of a volume is to be taken; obtaining a bitmap from a driver of the volume, the bitmap identifying changes to the volume since a last backup of the volume; and inserting the bitmap into the snapshot.

The snapshot having the embedded bitmap is mounted at the backup proxy host. A data mover 178 installed at the backup proxy host retrieves the bitmap from the mounted snapshot. As discussed, the bitmap identifies changes made by the production host to the production source volume. The data mover can then perform the differential or incremental backup from the snapshot to backup blocks that have changed since the last backup according to the bitmap. Specifically, each block of the volume has a corresponding address mapped in the bitmap. The data mover reads the bitmap to determine whether or not a particular block has changed, e.g., whether or not a flag or bit for the particular block has been set. If, for example, the flag or bit has been set, e.g., bit set to 1, the data mover reads the corresponding block from the snapshot and writes the block data of the source volume to the backup media at secondary storage.

In other words, to conduct the differential backup, blocks of the source volume that have changed since the last backup of the source volume according to the bitmap are copied from the source volume to secondary storage. Blocks that have not changed since the last backup of the source volume are excluded from being copied to secondary storage. Snapshots, e.g., snapshot 175', along with corresponding embedded bitmaps, e.g., bitmap 157', are also copied to and maintained at secondary storage. The embedding of the bitmap into the snapshot provides an efficient way to allow the backup proxy host to identify the changes made to the source volume since the last backup—even though the backup proxy host was outside the IO path of the production host.

Table A below shows a flow of events on the production host for full and incremental backups according to one or more embodiments.

TABLE A

| Step | Description |
|---|---|
| 1 | Install block-based CBT filter driver. |
| 2 | A third party or any backup software product takes a snapshot. |
| 3 | When the snapshot is taken, filter driver receives notification and starts tracking the changes for a volume. |
| 4 | Full backup |
| 4A | Backup software mounts the snapshot on the proxy and send bitmap as empty. |
| 4B | Backup software waits for proxy to finish the rollover. |
| 5 | Incremental backup |
| 5A | Backup software obtains the bitmap from the filter driver. |
| 5B | Backup software stores the bitmap on a location which is accessible by the proxy. |
| 5C | Backup software informs the proxy and issues request to perform incremental rollover. |
| 5D | Backup software waits for proxy to finish the rollover. |

Table B below shows a flow of events on the backup proxy host for full and incremental backups according to one or more embodiments.

TABLE B

| Step | Description |
|---|---|
| 1 | Full backup |
| 1A | Rollover the complete data to backup storage using BBB data mover. |
| 1B | Informs the production host once rollover is done. |
| 2 | Incremental backup |
| 2A | Invokes the BBB data mover and specifies the location of bitmap. |
| 2B | BBB data mover reads the changed blocks using the bitmap as the pointer. |
| 2C | Informs the production host once rollover is complete. |

Embedding or inserting the bitmap into the snapshot results in the bitmap becoming an integral part of the snapshot itself. That is, the bitmap does not exist separately from the snapshot. This removes all overhead of bitmap management post snapshot, both on the production host and proxy. As discussed, once a snapshot is taken, there is a brief period of time, e.g., about 10 seconds, in which the snapshot is writeable. Once the period of time elapses, the snapshot becomes read-only in order to preserve the state of the snapshotted volume at the time the snapshot was taken.

For example, the volume shadow copy service (VSS) snapshot gives a window of opportunity during which it is possible to modify the snapshot. That is, it is possible to add, modify, or delete files on the snapshot. This period of time is provided in order to allow for excluding or deleting files or other items from the snapshot that the user (or customer of the backup application) does not wish to backup such as operating system files, temporary staging area items, or other files that do not need backing up and thus would consume unnecessary space on secondary storage. In an embodiment, a technique leverages this window and embeds (e.g., copies) the bitmap into the snapshot itself.

A flow for conducting a backup and embedding a bitmap into a snapshot are given below in tables C and D. Table C below provides details for operations on the production host according to one or more embodiments.

TABLE C

| Step | Description |
|---|---|
| 1 | Provide or create a custom VSS writer (e.g., backup application writer). In an embodiment, the custom writer is not associated to any application as such. This is a proxy writer and includes all mandatory event handling methods implemented, such as OnPrepareBackup( ), OnBackupComplete( ), OnPreRestore( ), OnPostRestore( ), OnPostSnapshot( ) and OnIdentify( ). Out of these, two, OnPostSnapshot( ) and OnIdentify( ) are the most important for this approach of embedding the bitmap into the snapshot. |
| 2 | Allow custom writer to be discovered during metadata gathering like other application/system writers using OnIdentify( ) method. |
| 3 | Allow, upon a snapshot process being initiated, all relevant writers along with this custom writer to participate in the process. |
| 4 | Fire, when the snapshot is about to complete, OnPostSnapshot( ) for each writer that participated in the snapshot process. The method, OnPostSnapshot( ) gives an opportunity to individual writers to modify the snapshot if they want. |
| 5 | Using the OnPostSnapshot( ) method, create a file in the snapshot at a prefixed location known to proxies (universal path) and write the bitmap information to this file. This bitmap is retrieved from the changed block-based backup (BBB) driver. The BBB driver is aware of the right moment when to flush the bitmap into memory. The custom writer retrieves this bitmap from the BBB driver and saves it into the snapshot as mentioned above. Now the bitmap is permanent and integral part of the snapshot. |

Table D below provides details for operations on the proxy host according to one or more embodiments.

TABLE D

| Step | Description |
|---|---|
| 1 | Mount the snapshot on the proxy. |
| 2 | Agents on the proxy locate and retrieve the bitmap file that has been embedded into the snapshot. Agents on the proxy are preconfigured with the location of the bitmap file on the snapshot (e.g., \\?\\volume\bitmap). |
| 3 | Agents open the bitmap file and backup the data which has changed since previous backup using the bitmap information. |

Thus, in an embodiment, a technique to facilitate differential or incremental backups involves the sharing of the bitmap from a production host to the backup proxies. That is, the bitmap is made available on or to the proxy. As discussed, in an embodiment, the bitmap is embedded or copied to the snapshot.

It should be appreciated, however, that there are multiple ways to make the bitmap available to the backup proxies. For example, in another embodiment, the bitmap is sent to the proxy as part of the backup input payload itself. This can be suitable for smaller change rates or smaller source volumes requiring backup. The size of bitmap may be estimated. Inputs may include a size of the volume, change block size, percent (%) change (lowest to highest) and average. A consideration is the serialization/de-serialization of bitmap In other embodiment, there can be a shared location with cache on the proxy. That is, there can be a dedicated share (cache) in the environment in which all proxies have access to this share. This makes size immaterial. The share is to be protected from any external manipulations. Various checksum methods may be employed for this purpose. There may be a cache on the proxy itself; and the production server may transfer the bitmaps to the cache.

Figure 9:
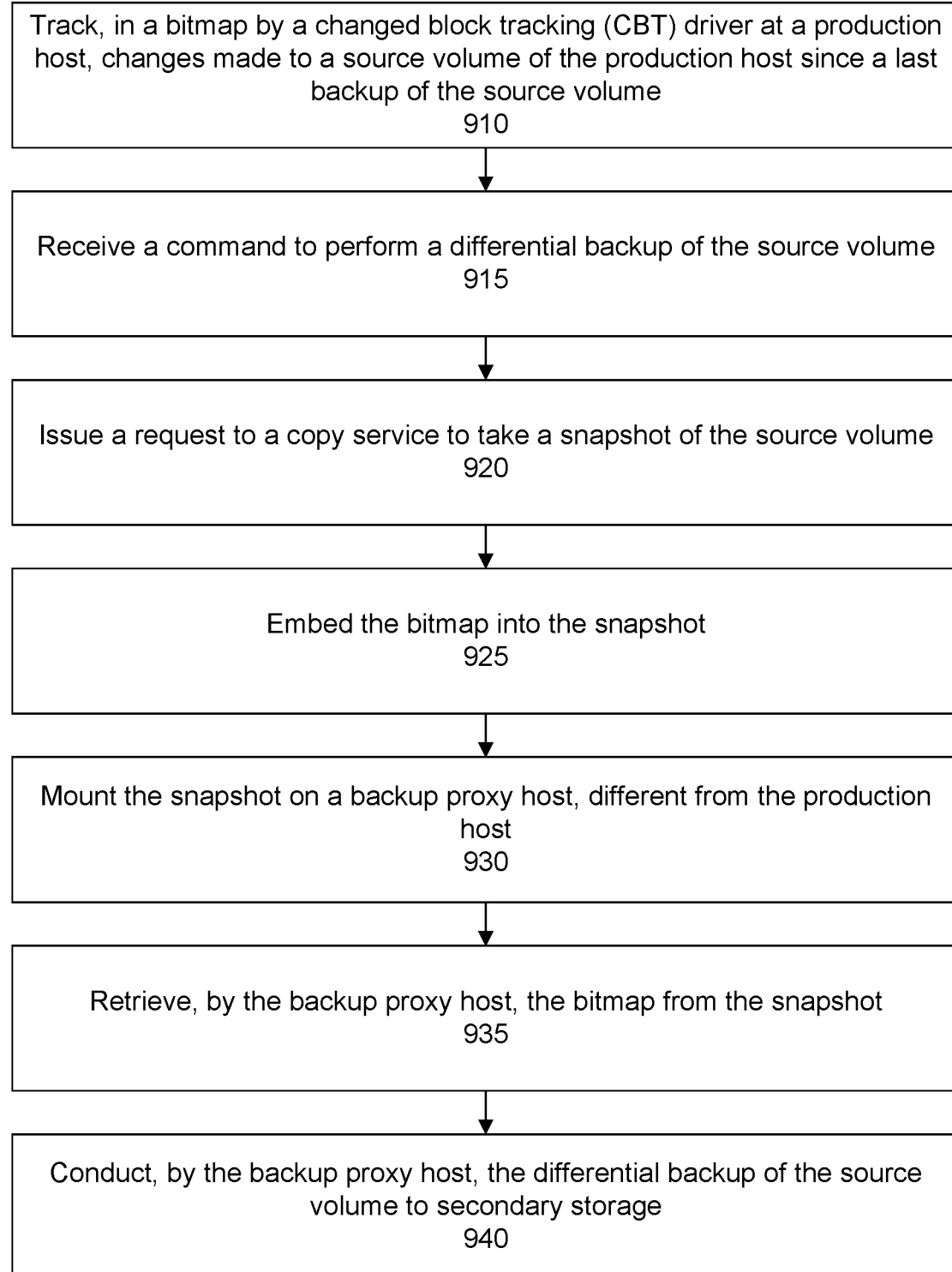
FIG. 9 shows a flow for embedding a bitmap into a snapshot, according to one or more embodiments.

FIG. 9 shows an overall flow for storage integrated differential block-based backup according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 910, a changed block tracking driver at a production host tracks, in a bitmap, changes made to a source volume of the production host since a last backup of the source volume.

In a step 915, a command is received to perform a differential backup of the source volume.

In a step 920, a request is issued to a copy service to take a snapshot of the source volume.

In a step 925, the bitmap is embedded into the snapshot. For example, a file may be created in the snapshot at a predetermined path or location on the snapshot and the bitmap may then be written to the file. More specifically, the bitmap is embedded into the snapshot after the request for taking a snapshot is initiated and before the snapshot becomes read-only.

In a step 930, the snapshot is mounted on a backup proxy host, different from the production host.

In a step 935, the backup proxy host, e.g., agents on the backup proxy host, locate and retrieve the bitmap from the snapshot. The agents are programmed with or are aware of the predetermined path or location on the snapshot at which the bitmap is located. The agents may traverse the predetermined path on the snapshot to locate the file containing the bitmap. An agent can then open the file to access the bitmap and thus identify the changes to be backed up while excluding other data that has not changed since the last backup.

In particular, in a step 940, the backup proxy host conducts the differential backup of the source volume to secondary storage from the mounted snapshot according to the changes as identified by the bitmap. That is, the backup proxy host (or data mover at the backup proxy host) reads from the snapshot mounted at the backup proxy the changes made to the source volume according to the bitmap. The backup proxy host (or data mover at the backup proxy host) writes these changes to secondary storage while the production host continues to service production requests.

Making the bitmap part of the snapshot itself facilitates other applications such as backing up the entire bitmap along with other data; using the bitmap for checking the consistency of every backup or selected backups to reduce the chances of data losses; using the bitmap at a later date to regenerate incremental backups from the synthetized virtual full backups, i.e., reversing the backup chain; finding the delta between any two backups anytime, without presence of the source data; optimize and increase the effectiveness of indexing of the backup data (just from the bitmap); facilitating incremental block based restore (restore CBT); and others.

For example, referring back now to FIG. 1, in another embodiment, the backup system includes a backup chain regenerator 181. The backup chain regenerator is responsible for regenerating the chain of incremental backups, including the associated prior full backup, that have been merged to create the synthetic full backup.

Synthetic full backups allow for faster recoveries by eliminating the need to manage a chain of incremental backup copies. However, the merging of a chain of incremental backups to create a synthetic full backup reduces the number of available or intermediate recovery points represented by each incremental backup. The ability to view changes for a particular backup is lost as the changes will have been merged into other backup copies to create a single synthetic full backup copy. In other words, an incremental backup, once merged, may no longer be available as a recovery point.

As an example, consider that there is a full backup of a volume followed by a chain of incremental backups including first, second, and third incremental backups representing first, second, and third points in time, respectively. In this example, each of the full and incremental backups are maintained on secondary storage. The volume may be recovered to a point in time of the full backup or to any of the first, second, and third points in time by selecting one or more appropriate incremental backups to apply. For example, to recover to the first point in time, the full backup may be restored to the volume and then the first incremental backup may be applied. To recover to the second point in time, the full backup may be restored to the volume and then the first incremental backup may be applied, followed by the second incremental backup, and so forth.

However, merging the incremental backups into the full backup to create a synthetic full backup at secondary storage can reduce the number of recovery points to only the third point in time or most recent backup. As discussed, however, synthesizing full backups helps to facilitate good recovery time objectives. For example, over time there may be an increasing number of incremental backups stored on the backup media. These incremental backups are dependent on previous backups and cannot be recovered separately or without the previous backup copy. The number of incremental backups is inversely proportional to recovery performance. Thus, as the number of incremental backups increases the restore performance decreases. Further, managing many separate incremental backups in the media (e.g., managing retention periods and expiration times and dates) can be very cumbersome.

There can be cases in which it is desirable to regenerate the chain of incremental backups from the synthetic full backup. For example, being able to regenerate the chain of incremental backups can allow for intermediate recoveries (e.g., recovering to a point in time before a last or most recent incremental backup). Being able to have intermediate recoveries can be desirable in cases where a data corruption issue has been discovered in an incremental backup.

In an embodiment, bitmaps embedded into the snapshots maintained at secondary storage along with the changed data blocks are used to provide point in time deltas that have been lost though the synthetic full backup generation process. That is, a particular bitmap embedded into a particular snapshot may be used to view changes that were part of a backup corresponding to the particular snapshot. In an embodiment, the change information stored in the particular bitmap for the particular snapshot is used in a reversed fashion to regenerate a particular incremental backup associated with the particular snapshot.

Figure 10:
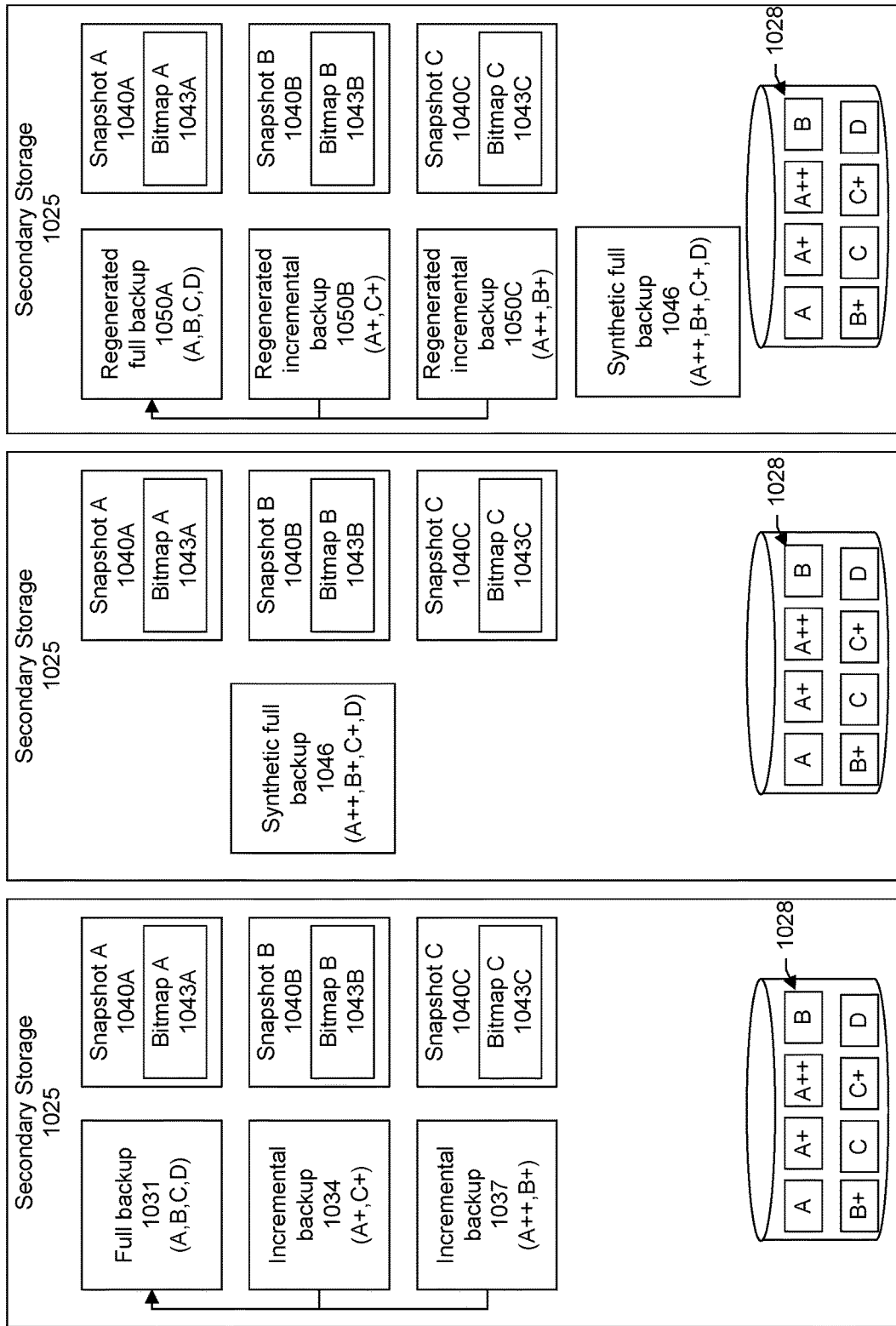
FIG. 10 shows a flow for regenerating an incremental backup chain that has been merged, according to one or more embodiments.

FIG. 10 shows an overall flow for regenerating a chain of incremental backups using the bitmaps embedded into the snapshots corresponding to the incremental backups. In a step 1010, a backup chain including an incremental backup of a source volume is merged into a full backup of the volume to create a synthetic full backup of the volume. The full backup corresponds to a state of the volume at a first time, and the synthetic full backup corresponds to a state of the volume at a second time, after the first time.

In a step 1015, a bitmap that was embedded into a snapshot of the source volume is retrieved, the snapshot having been taken at the second time for the incremental backup, and the bitmap identifying data from the source volume that was to be copied to secondary storage for creation of the incremental backup.

In a step 1020, the backup chain is regenerated by copying from the snapshot the data identified by the bitmap to a regenerated incremental backup, e.g., virtual hard disk corresponding or representing the regenerated incremental backup.

As an example, consider that a backup chain including first and second incremental backups of a volume have been merged with a full backup of the volume to create a synthetic full backup of the volume. The first incremental backup was made at a first time. The second incremental backup was made at a second time, after the first time. To regenerate the backup chain, a first snapshot of the volume taken at the first time for the first incremental backup is retrieved from secondary storage. Embedded into the first snapshot is a first bitmap identifying changed blocks on the volume that were to be copied to secondary storage for the first incremental backup.

The first bitmap may be scanned to identify the changed blocks associated with the first snapshot and now residing at secondary storage along with the first snapshot. The changed blocks may then be copied into a first container, e.g., first virtual hard disk, to create a regenerated first incremental backup.

Similarly, a second snapshot of the volume taken at the second time for the second incremental backup is retrieved from secondary storage. Embedded into the second snapshot is a second bitmap identifying changed blocks on the volume that were to be copied to secondary storage for the second incremental backup.

The second bitmap may be scanned to identify the changed blocks associated with the second snapshot and now residing at secondary storage along with the second snapshot. The changed blocks may then be copied into a second container, e.g., second virtual hard disk, to create a regenerated second incremental backup.

For example, FIGS. 10A-C show first, second, and third states, respectively of secondary storage 1025. As shown in the example of FIG. 10A, secondary storage includes a set of data blocks 1028, full backup 1031, first and second incremental backups 1034, 1037, respectively, and snapshots 1040A-C having respective embedded bitmaps 1043A-C. Each snapshot is associated with a particular backup and a bitmap embedded into a snapshot identifies changed blocks associated with the particular backup. For example, in the initial or full backup, all blocks, e.g., A, B, C, and D are stored to backup media. In the first incremental backup, bitmap 1043B has captured what has changed since the full backup. In the example shown in FIG. 10A, blocks A and C have changed and are shown as A+ and C+. Thus, the first incremental backup includes A+ and C+. In the second incremental backup, bitmap 1043C has captured what has changed since the first incremental backup. In the example shown in FIG. 10A, blocks A and B have changed and are shown as A++ and B+. Thus, the second incremental backup includes A++ and B+.

In FIG. 10B, the incremental backups have been merged into the full backup to generate a synthetic full backup 1046. The synthetic full backup represents a state of the source volume as of the last incremental backup. Thus, the synthetic full backup includes blocks A++, B+, C+, and D.

As shown in the example of FIG. 10B, changes relative to the different backups cannot be identified because the synthetic full backup incorporates the latest changes as of the most recent incremental backup. For example, the user is not able to compare or view changes between the full backup and first incremental backup. The user is not able to compare or view changes between the first incremental backup and the second incremental backup.

However, the bitmaps embedded into the snapshots maintained on secondary storage allow for a reconstruction or regeneration of the backup chain. Thus, in the example of FIG. 10C bitmap 1043C from snapshot 1040C has been accessed to identify and retrieve blocks A++ and B+ from secondary storage media which may then be copied into a container representing a regenerated version 1050C of the second incremental backup. Bitmap 1043B from snapshot 1040B has been accessed to identify and retrieve blocks A+ and C+ from secondary storage media which may then be copied into a container representing a regenerated version 1050B of the first incremental backup. Bitmap 1043A from snapshot 1040A has been accessed to identify and retrieve blocks A, B, C, and D from secondary storage media which may then be copied into a container representing a regenerated version 1050A of the full backup. Thus, the regeneration process may be repeated or iterated with each remaining snapshot having an embedded bitmap until the full backup chain has been regenerated.

Regenerating the incremental backup chain of a volume allows for recovering the volume to the points in time corresponding to the incremental backups of the chain. This can be helpful in cases where one or more incremental backups have a data corruption error that was not discovered until after the incremental backups were merged to create a synthetic full backup— which is now itself corrupt as a result of the corrupted incremental backup. Upon regenerating the incremental backup chain, the chain can be cut at the last non-corrupt incremental backup. The remaining (non-corrupt) incremental backups can then be remerged into the previous full backup to generate another or new synthetic full backup that is not corrupt.

Figures 11, 11A:
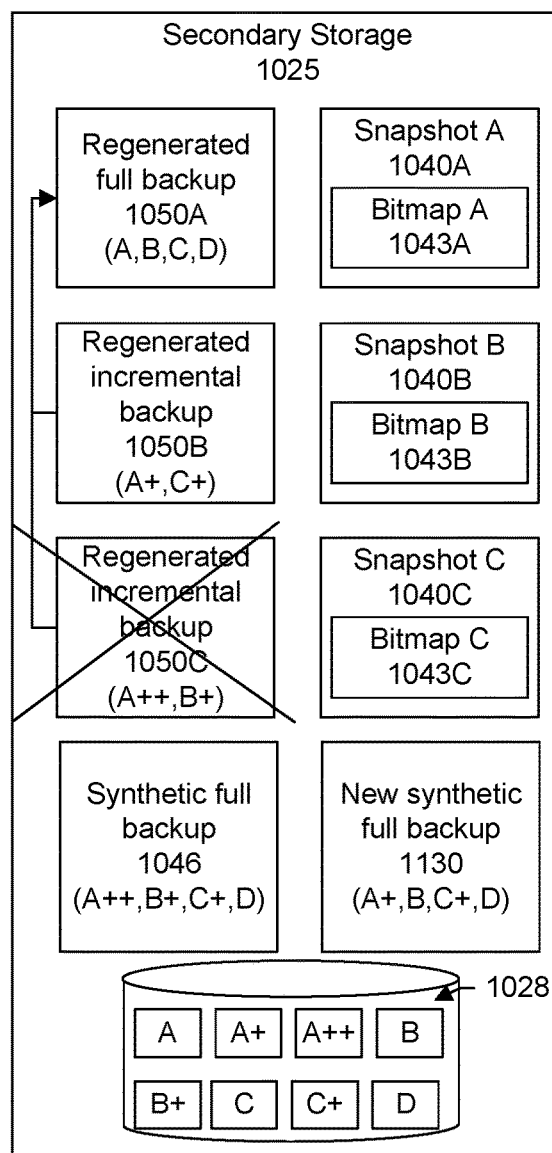
FIG. 11 shows a flow for cutting an incremental backup chain, according to one or more embodiments.
FIG. 11A shows an example of an incremental backup chain being cut and a new synthetic full backup being regenerated, according to one or more embodiments.

FIG. 11 shows a flow for cutting a backup chain. In a step 1110, upon a backup chain of synthetic full backup being regenerated, identify an incremental backup in the backup chain after which the backup chain should be cut. In a step 1115, remaining incremental backups in the backup chain are merged into a full backup to generate another synthetic full backup that excludes incremental backups cut from the backup chain.

As an example, consider that the second incremental backup shown in FIG. 10A has been identified as having a data corruption problem, but the problem was not identified until after the synthetic full backup was generated (FIG. 10B). The synthetic full backup thus incorporates the data corruption problem.

The impact of the problem can be mitigated by regenerating the backup chain, cutting the problematic incremental backup from the backup chain, and regenerating a version of the synthetic full backup with the remaining valid incremental backups, but without the invalid incremental backups. In other words, incremental backups after a particular incremental backup may be excluded from the synthetic full operation. The particular incremental backup may be a last valid incremental backup.

For example, as shown in FIG. 11A, upon regenerating the backup chain, the second incremental backup may be cut as indicated by an "X" superimposed over the regenerated version of the second incremental backup. A new synthetic full backup 1130 may then be generated by merging the regenerated versions of the full and first incremental backup while excluding the second incremental backup. Thus, while the changes as of the second incremental backup may be lost, the new synthetic full backup allows the user to recover up to the first incremental backup.

Another benefit of backup chain regeneration is the ability to view and compare backup images at different points in time. Being able to compare backups at different points in time can be useful for purposes of audit, anomaly detection, uncovering data corruption, disaster recovery testing, and the like. For example, the synthetic full backup image shown in FIG. 10B represents a state of the source volume as of the last incremental backup, e.g., the second incremental backup. The synthetic full backup, however, does not provide a view of the source volume as of the first incremental backup.

However, the backup chain can be regenerated (FIG. 10C) and new synthetic full backup image generated (FIG. 11A, 1130) that incorporates the first incremental backup and excludes the second incremental backup. The new synthetic full backup can then provide a view of the source volume at a point in time as of the first incremental backup. The user can recover the production host to different points in time without having to maintain and manage multiple incremental backup copies on secondary storage.

Maintaining the bitmaps at secondary storage further facilitates file indexing. For example, a block based backup of a file system may bypass the file system during the backup process as blocks are read directly from the source volume. For purposes of cataloging, however, it is desirable to index the files or identify which blocks are related to which files in order to generate and record metadata about when a file was last modified or changed. Typically, indexing involves reading an entire full or synthetic full backup each time the backup copy is generated. The embedded bitmaps, however, allow for focusing the indexing process on only files that have changed. That is, the bitmap identifies blocks that have changed which in turn can be mapped to the files that they belong to. This information can then be used to index a portion of the synthetic full backup copy and the particular files that have changed.

The bitmaps can be accessed to stitch together blocks from different versions of a file between backups and thus recreate different versions of the file. The bitmaps can be used for partial recoveries of the source volume. For example, consider that a state of the secondary storage system is as shown in FIG. 10B in which the backup copies have been merged to create the synthetic full backup. A typical recovery process involves recovering the entire production host source volume by applying the entire synthetic full backup copy to the source volume. For example, bitmap 1043A (FIG. 10B) can be read to identify the blocks needed to be copied to the source volume in order to recover the source volume to a point of the initial full backup. Bitmap 1043B can be read to identify the blocks needed to be copied to the source volume in order to recover the source volume to a point of the first incremental backup, and so forth.

A recovery from secondary storage may proceed as a "reversed" incremental backup rather than having to recover an entire backup. For example, consider that a full backup has been conducted of the production host. Thereafter, changes occurred at the production host and such changes were backed up in an incremental backup. A bitmap identifying the changes is included as part of the incremental backup and maintained on secondary storage. The incremental backup is subsequently merged into the full backup to create a synthetic full backup image. If the user wishes to revert back to a state of the incremental backup, the bitmap can be accessed to identify the changed blocks that should be copied from secondary storage to the production host. Other blocks on secondary storage do not have to be copied from secondary storage to the production host. The user does not have to recover the entire synthetic full backup image.

In today's world, dangers lurk everywhere. Even data protection itself is not immune from this danger. Data including data designated for long term storage may be corrupted. This can be a very serious issue when corrupted data is backed up and customers are unaware of this fact. When at a later date in the future there is a need to restore, the customer will end up corrupted data. At this late point, there may be no recourse. In some cases, the customer or end-user will blame the backup product vendor for the data corruption. The accusation can place the backup product vendor in a difficult position as it may not be clear as to whether the data corruption was part of the original source data or was introduced during the backup process.

To avoid such situations, it is desirable to ensure that data is backed up without any corruption by detecting and notifying of any data corruption contemporaneously with the backup operation. There can be several actors involved in overall process depending upon what is being protected. For example, if applications data is protected, then application knowledge is needed. If a filesystem is to be protected then different approach is needed. In an embodiment, systems and techniques provide a holistic view for separating backup validation into multiple stages. Depending upon needs, the appropriate validation method can be chosen.

Referring back now to FIG. 1, in another embodiment, the backup system includes a backup validation framework 183. In an embodiment, the backup validation framework allows the customer or end user to provide and specify their own scripts for validating a backup copy. This type of validation may be referred to as backup copy validation as a process or workflow. In this embodiment, the framework of the backup application includes hooks or interfaces that call or invoke validation scripts, external to the backup application. In an embodiment, the scripts are provided by the user or third party. In another embodiment, the scripts may be included by the backup application vendor.

The calls to the validation scripts may be made as a final step of the backup process or once a backup copy has been stored to secondary storage in order to validate the backup copy before the backup copy is marked frozen, complete, or retention locked on secondary storage. The framework allows the user to maintain a degree of control over the validation logic and options. For example, the user can retain responsibility for at least a portion of checksum computation and frequency of validation. The user can select the type of checksum algorithm to be used, e.g., MD5, SHA-1, SHA-256, SHA-512, or other.

Figure 12:
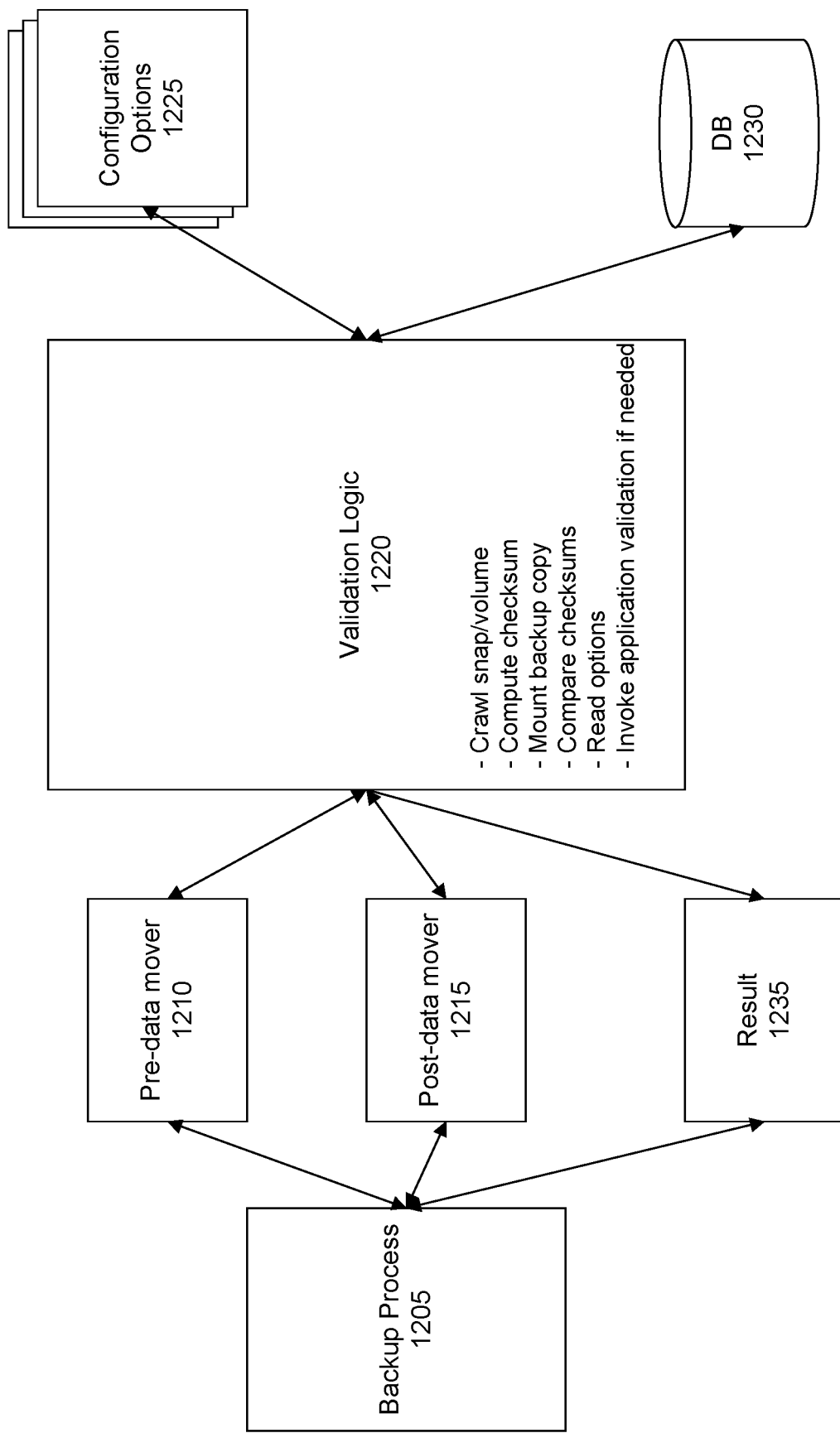
FIG. 12 shows a block diagram for validating a backup copy, according to one or more embodiments.

FIG. 12 shows a block diagram for backup validation as a process or workflow. As shown in the example of FIG. 12, there is a backup process 1205 that interfaces with pre and post data movers 1210, 1215, respectively, which in turn interface with validation logic 1220. The validation logic receives configuration validation options 1225 and stores and accesses validation information in a database 1230. The validation logic processes the validation information to generate a result 1235 to the backup process indicating whether or not a particular backup is valid. Operations of the validation logic may include crawling the snapshot volume, computing checksums, mounting the backup copy, comparing checksums, reading validation options, and invoking application validation if needed. A notification to the user may be generated indicating the validation result.

Backup validation as a process or workflow can be used with products which lack intimate knowledge of what needs to be validated and how. In an embodiment, backup validation and a process or workflow relies on external components to perform the validation work and provides hooks which can be used. Consider, as an example, that the overall workflow for validation does not exist in a backup product. There is, however, an urgent need to validate backup. Table E below shows a flow for validating a backup according to one or more embodiments.

TABLE E

| Step | Description |
|---|---|
| 1 | Checksum of files are computed in a database before snapshot. |
| 1A | After backup, backup is mounted on the same host. |
| 1B | Checksum is computed from the mounted backup copy. |
| 1C | Database is populated with these checksums. |
| 2 | Scripts may be included with the backup product. |
| 3 | Expose validation options in configuration files. Validation options may include, for example: |
| 3A | Validate every full backup |

TABLE E-continued

| Step | Description |
|---|---|
| 3B | Validate every fifth incremental |
| 3C | Randomly pick or select any backup on any given dates of the month |
| 3D | Other validation options |
| 4 | If any inconsistency is found in backup, fail the backup |

Figure 13:
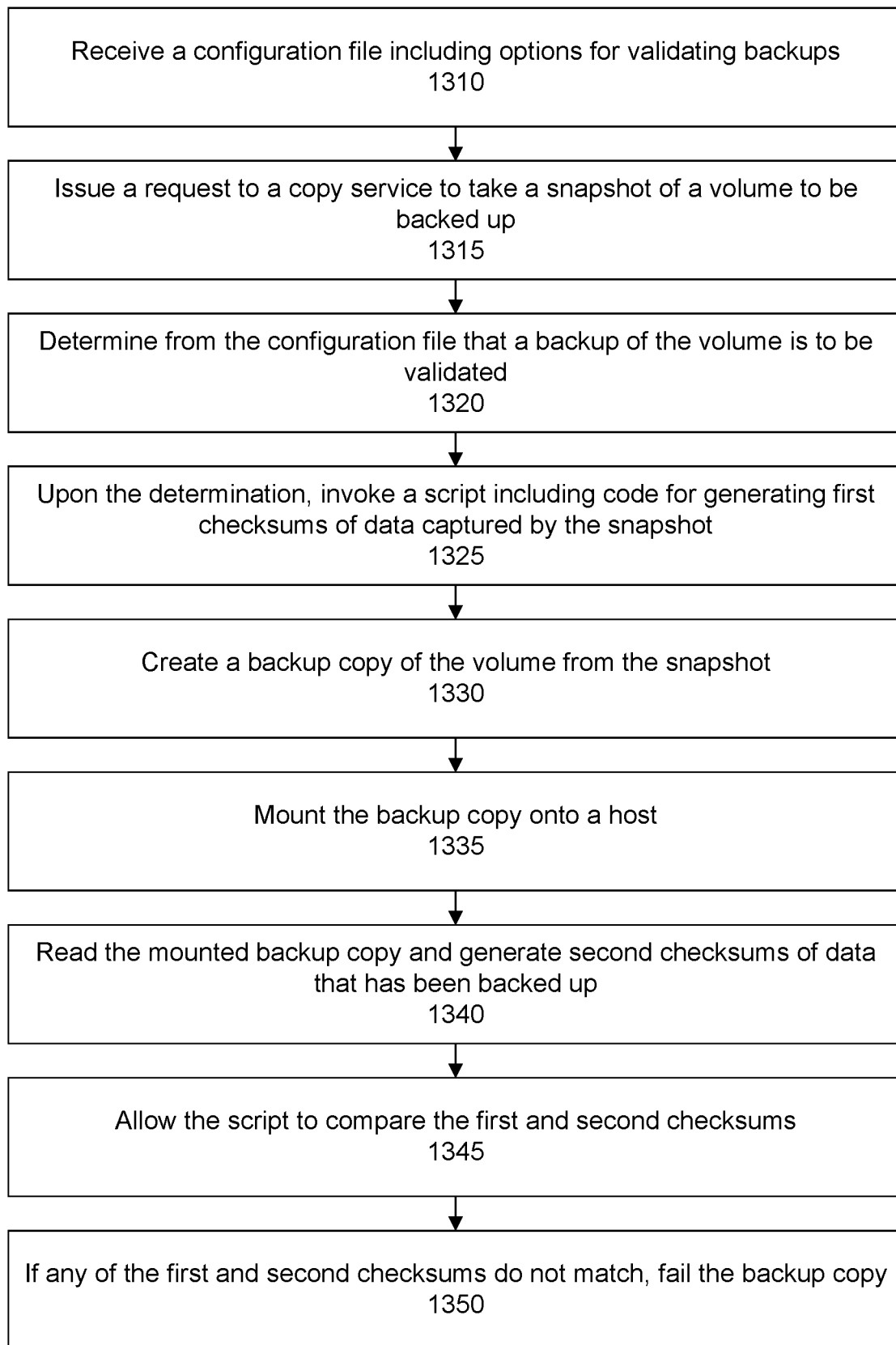
FIG. 13 shows a flow for validating a backup copy, according to one or more embodiments.

FIG. 13 shows an overall flow for backup validation as a process or workflow according to one or more embodiments. In a step 1310, a configuration file (or other configuration input) is received. The configuration file includes options for validating backups. In a step 1315, a request is issued to a copy service to take a snapshot of a volume to be backed up. In a step 1320, a determination is made from the configuration file that a backup of the volume is to be validated. For example, the configuration file may specify a frequency at which validation is to be performed, types of backups upon which validation is to be performed, dates at which validation is to be performed, threshold backup number or count at which validation is to be performed, random selection options, or combinations of these. Validation consumes compute resources thus these validation configuration options provide flexibility to individual customers and users to set the validation options they deem most appropriate for their organizations.

In a step 1325, upon the determination, a script is invoked. The script includes code for generating first checksums of data captured by the snapshot. The first checksums may be stored in a database or other competent data structure or repository.

More particularly, in an embodiment, a technique of the backup process involves taking a snapshot of a source volume to be backed up. The snapshot provides a point in time copy of the source volume at the time the snapshot is taken. The backup can proceed using the snapshot while the production host continues to service production requests and make writes to the source volume. Once the backup validation framework receives an indication from the copy service that the snapshot has been taken, the validation framework calls or invokes an external validation script and provides a handle to the snapshot to the validation script. In an embodiment, the validation script is provided by a customer or user of the backup application. In another embodiment, the validation script is provided by the vendor of the backup application.

In an embodiment, the validation script is responsible for reading or crawling the snapshot for each file and folder included in the snapshot and generating a checksum (e.g., first checksums) of the files and folders. A checksum is generated by applying a cryptographic hash function to the data. The function takes an input and produces a string (e.g., a sequence of numbers and letters) of a fixed length. A checksum may be referred to as a hash.

The first checksums are dumped into a database and stored for later comparison and cross-checking once a backup copy has been made. In an embodiment, the database is a SQLite file. The SQLite database file includes a schema that may describe the metadata of the snapshotted files and folders to be captured in order to perform the validation. For example, along with checksums of the snapshotted files and folders, the validation logic may further capture file and folder identifiers, names, sizes, and the like.

Table F below shows an example of checksums generated for data of the snapshot that may be stored in the database.

TABLE F

| Snapshot Item | First Checksums |
|---|---|
| file A | checksum 215 |
| file B | checksum 741 |
| file C | checksum 014 |
| ... | ... |

In a step 1330, a backup copy of the volume is created from the snapshot. For example, the snapshot may be mounted into a host (e.g., backup proxy host). The host proceeds to rollover the data from the snapshot by reading the snapshot and copying from the snapshot the referenced data from the source volume to secondary storage in order to create the backup copy.

In a step 1335, the backup copy is mounted onto a host (e.g., backup proxy host). In a step 1340, the mounted backup copy is read and second checksums are generated of data that has been backed up. The second checksums may similarly be stored in the database along with the first checksums. Table G below shows an example of checksums generated for data of the backup copy now residing on secondary storage.

TABLE G

| Backup Copy Item | Second Checksums |
|---|---|
| file A | checksum 215 |
| file B | checksum 741 |
| file C | checksum 015 |
| ... | ... |

In a step 1345, the script compares or cross-checks the first and second checksums. In a step 1350, if any of the first and second checksums do not match, the backup copy is failed. For example, according to the sample information shown in tables F and G above, the checksum for file A computed from the snapshot matches the checksum for file A computed from the backup copy. The checksum for file B computed from the snapshot matches the checksum for file B computed from the backup copy. However, the checksum for file C computed from the snapshot does not match the checksum for file C computed from the backup copy. The detection of a mismatch triggers an alert notification to the user for further investigation.

In an embodiment, the technique of using validation scripts from the customer provides the customer with an opportunity to participate in the validation process. This joint approach can help provide reassurances to the customer that what has been backed up to secondary storage is exactly what existed on the source volume. The customer can compute their own checksums (first checksums) and cross-check the checksums with the checksums (second checksums) as computed by the backup application. As another example, both sets of checksums may be computed by the backup application, but a customer-provided script may be called after the checksum computations in order to compare the checksums.

In another embodiment, a customer-provided script may be responsible for an entire portion of the validation process. For example, in another embodiment, a customer-provided script may additionally compute the second checksums and perform the checksum cross-checking. In this embodiment, the backup application, upon completing the writing of the backup copy to secondary storage, but before committing the backup copy mounts the backup copy onto a host (e.g., backup proxy host) and calls the external script. The script is allowed to read the backup copy and compute second checksums of the data written to the backup copy. The script compares the first and second checksums for any mismatches. If any mismatch is found, the backup copy is not committed, the backup copy is marked as failed, and an alert notification is instead generated. The user interface of the management console may list a status of the backup copy as "failed."

The backup validation framework allows for the use of third party tools or utilities to perform the validation. For example, depending upon the type of data or application being backed up, there may be proprietary data formats that may pose a challenge to validating the data. In such cases, the validation framework can invoke third party validation tools which can recognize the proprietary data formats and thus properly validate the backup copy. Such third party tools may be used to read the snapshot, compute first checksums of data captured by the snapshot, read the backup copy, compute second checksums of data captured by the backup copy, and cross-check the first and second checksums. The validation framework, upon receiving a notification of an invalid backup copy from the third party validation tool can then fail the backup copy and generate the alert notification (or alternatively commit the backup copy upon receiving a notification indicating that the backup copy is valid).

Referring back now to FIG. 1, in another embodiment, the backup system includes a backup validator 184. In this embodiment, backup validation exists as an integral or inline process during the backup operation rather than being a process that occurs after a backup copy has been made and stored to secondary storage. The backup validator is responsible for validating or checking the accuracy of a backup. This type of backup validation may be referred to as backup copy validation as an embedded object/entity. In an embodiment, every item of metadata may be cross-checked with the source during the backup itself rather than being a post-backup process. Alternatively, a selection of items of metadata may be cross-checked with the source. A benefit of this process is that it does not require mounting the backup copy after backup is complete because the validation process is inline with the backup.

It is desirable to ensure that backup operations including the reading, writing, and merging processes do not introduce any data corruption. Corruption can result from programming or computation errors that cause a wrong block to be read, a merging or writing of a changed block to a wrong location, and the like.

Figure 14:
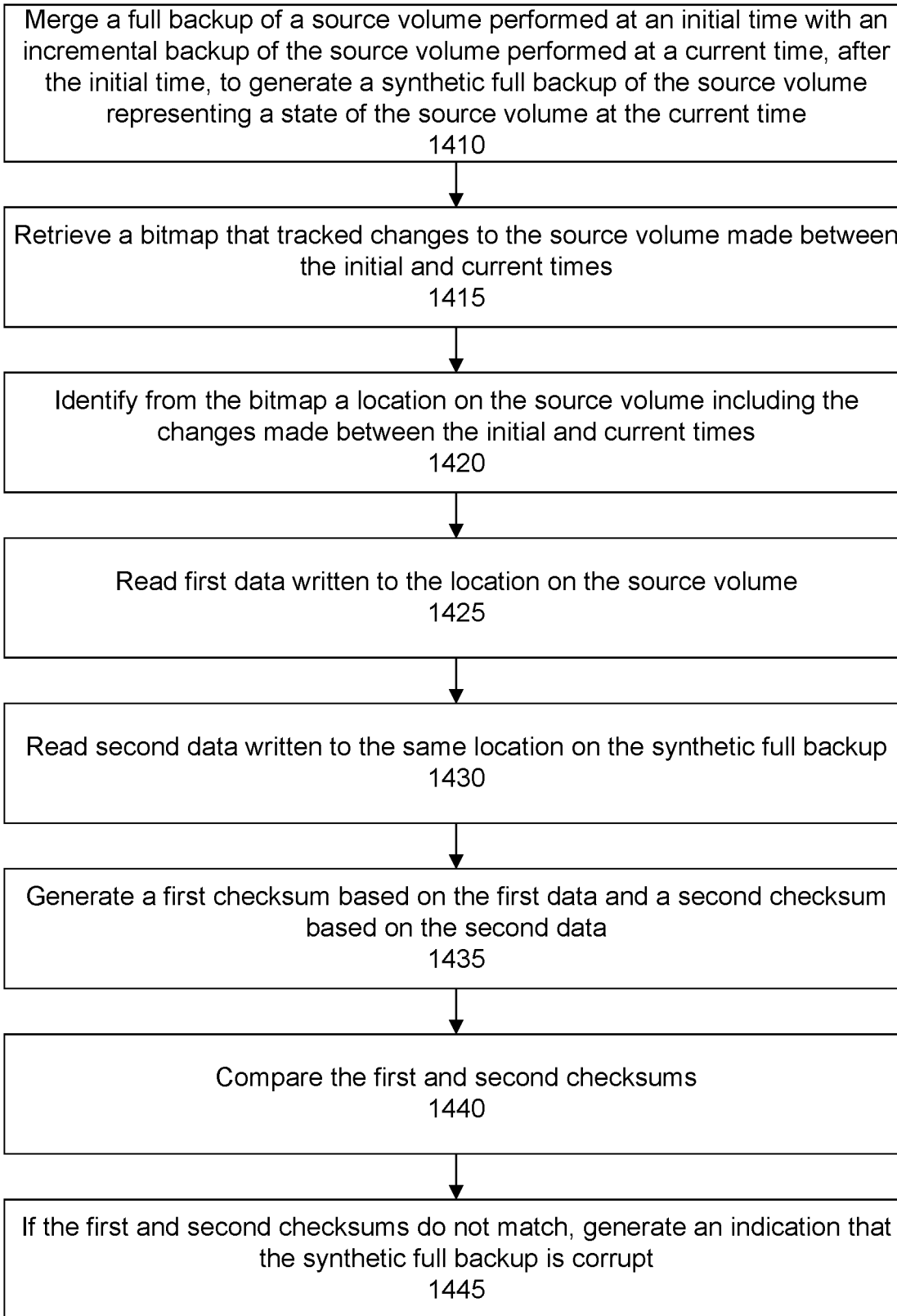
FIG. 14 shows a flow for validating a synthetic full backup, according to one or more embodiments.

FIG. 14 shows a flow for validating a synthetic full backup. In a step 1410, a full backup of a source volume created at an initial time is merged with an incremental backup of the source volume created at a current time, after the initial time, to generate a synthetic full backup of the source volume representing a state of the source volume at the current time.

In a step 1415, a bitmap is retrieved that tracked changes to the source volume made between the initial and current times. In a step 1420, an identification is made from the bitmap of a location on the source volume that includes the changes made between the initial and current times.

In a step 1425, first data written to the location on the source volume is read. In a step 1430, second data written to the same location on the synthetic full backup is read.

In a step 1435, a first checksum is generated based on the first data. A second checksum is generated based on the second data. In a step 1440, the first and second checksums are compared. In a step 1445, if the first and second checksums do not match, an indication is generated that the synthetic full backup is corrupt.

Figure 14A:
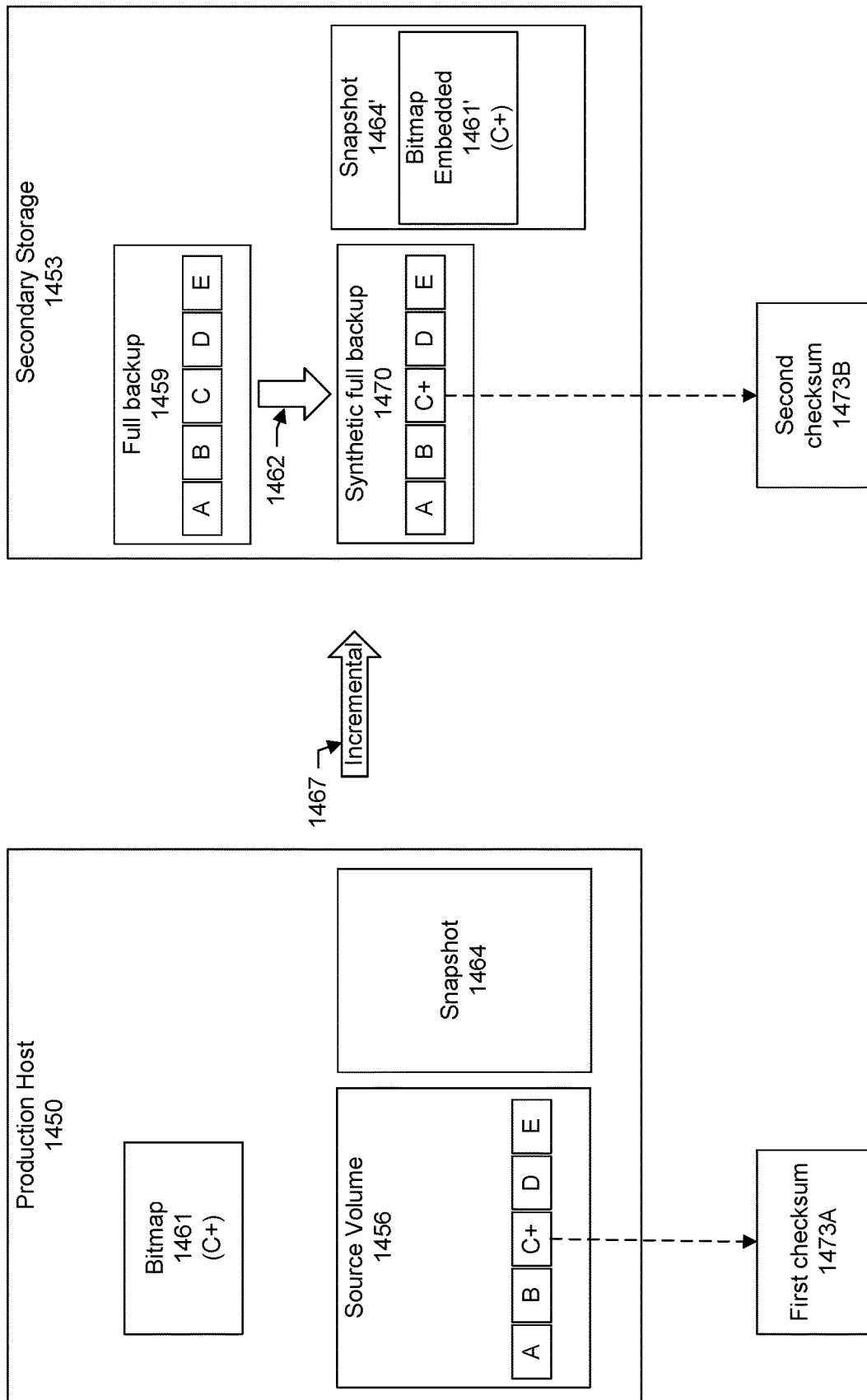
FIG. 14A shows an example of a block diagram for validating a synthetic full backup, according to one or more embodiments.

For example, FIG. 14A shows a block diagram of an example where the bitmap embedded with the snapshot is used to help validate the synthetic full process of a backup operation. FIG. 14A shows a production host 1450 and secondary storage 1453. The production host accesses a source volume 1456 storing production data. Secondary storage stores a full backup 1459 of the source volume. In the example shown in FIG. 14A, the source volume is shown at a current time and the full backup corresponds to a state of the source volume at a previous time of a last backup. The full backup is shown as having blocks A, B, C, D, and E. A bitmap 1461 at the production host has tracked changes since the last backup. The bitmap indicates that block C has changed as shown by a "+" symbol added to block C in the figure.

At the current time, a snapshot 1464 is taken of the source volume. The bitmap is examined in order to identify the changes and conduct an incremental backup 1467 of the source volume to secondary storage. According to the bitmap, a location on the source volume corresponding to block C has changed, e.g., C+. Block C+ is therefore copied to secondary storage during the incremental backup. The bitmap has been embedded into the snapshot and copied to secondary storage, see, e.g., snapshot 1464' and embedded bitmap 1461'. In the example shown in FIG. 14A, the incremental backup operation was accompanied by an on the fly merging 1462 (e.g., during runtime execution of the backup operation) of the incremental backup into the previous full backup to create a synthetic full backup 1470 on secondary storage. In an embodiment, creating the synthetic full backup includes reading unchanged blocks from the full backup, receiving changed blocks from the production host, and writing the blocks to their proper locations in the synthetic full backup.

In an embodiment, a validation of the backup operation includes identifying from the bitmap a location on the source volume including changes made between the previous and current times, reading first data written to the location on the source volume, and generating a first checksum 1473A based on the first data. Second data written to the same location on the synthetic full backup is read and a second checksum 1473B is generated based on the second data. The first and second checksums are checked against each other to determine whether or not the correct data was written to the correct location when generating the synthetic full backup. A mismatch of checksums indicates a problem with the backup operation and triggers an alert notification.

Figure 15:
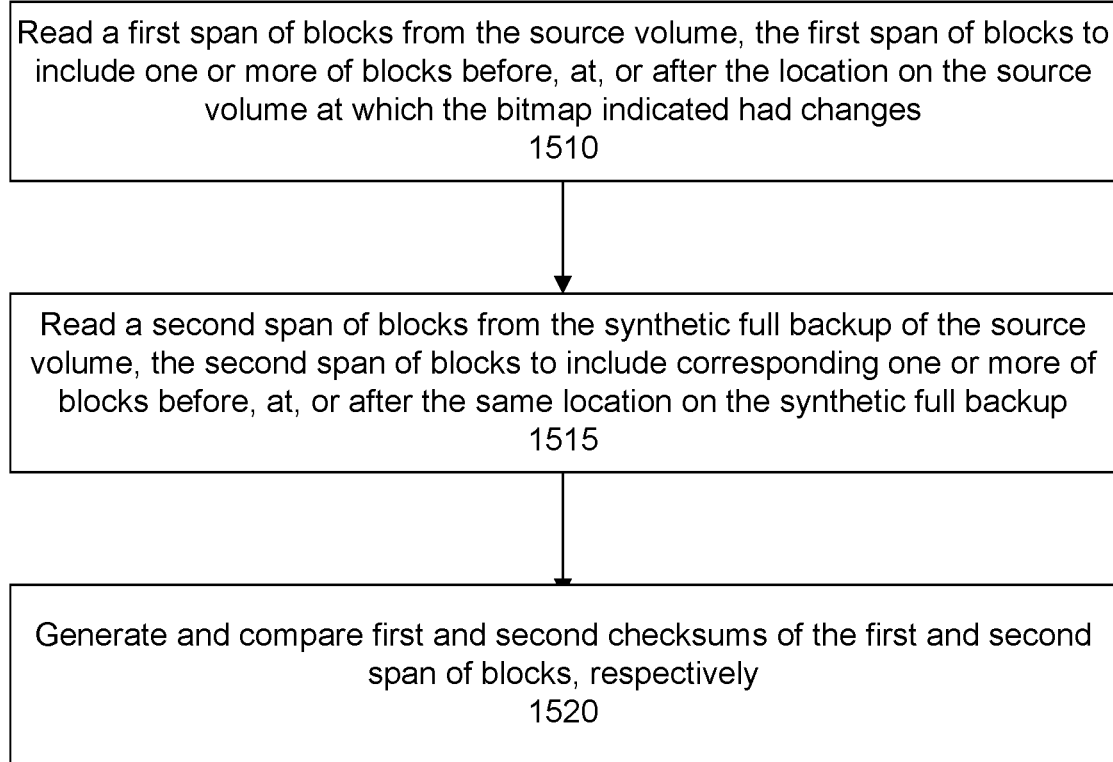
FIG. 15 shows further detail of a flow for validating a synthetic full backup, according to one or more embodiments.

FIG. 15 shows a flow for validating a backup copy according to another embodiment. In this embodiment, a further validation of the backup copy is obtained by reading not just blocks at a location that changed, but also blocks immediately before the location identified as having changes, blocks immediately after the location, or both.

In a step 1510, a first span of blocks is read from the source volume. The first span of blocks includes blocks at the location on the source volume, and at least one of blocks immediately before the location, or blocks immediately after the location on the source volume at which the bitmap indicated had changes.

In a step 1515, a second span of blocks is read from the synthetic full backup of the source volume. The second span of blocks includes blocks at the same location on the synthetic full backup as on the source volume, and at least one of blocks immediately before the location, or blocks immediately after the location.

In a step 1520, a first checksum of the first span of blocks is generated. A second checksum of the second span of blocks is generated. The first and second checksums are compared. Non-matching checksums indicate that the synthetic full backup is corrupt.

Figure 15A:
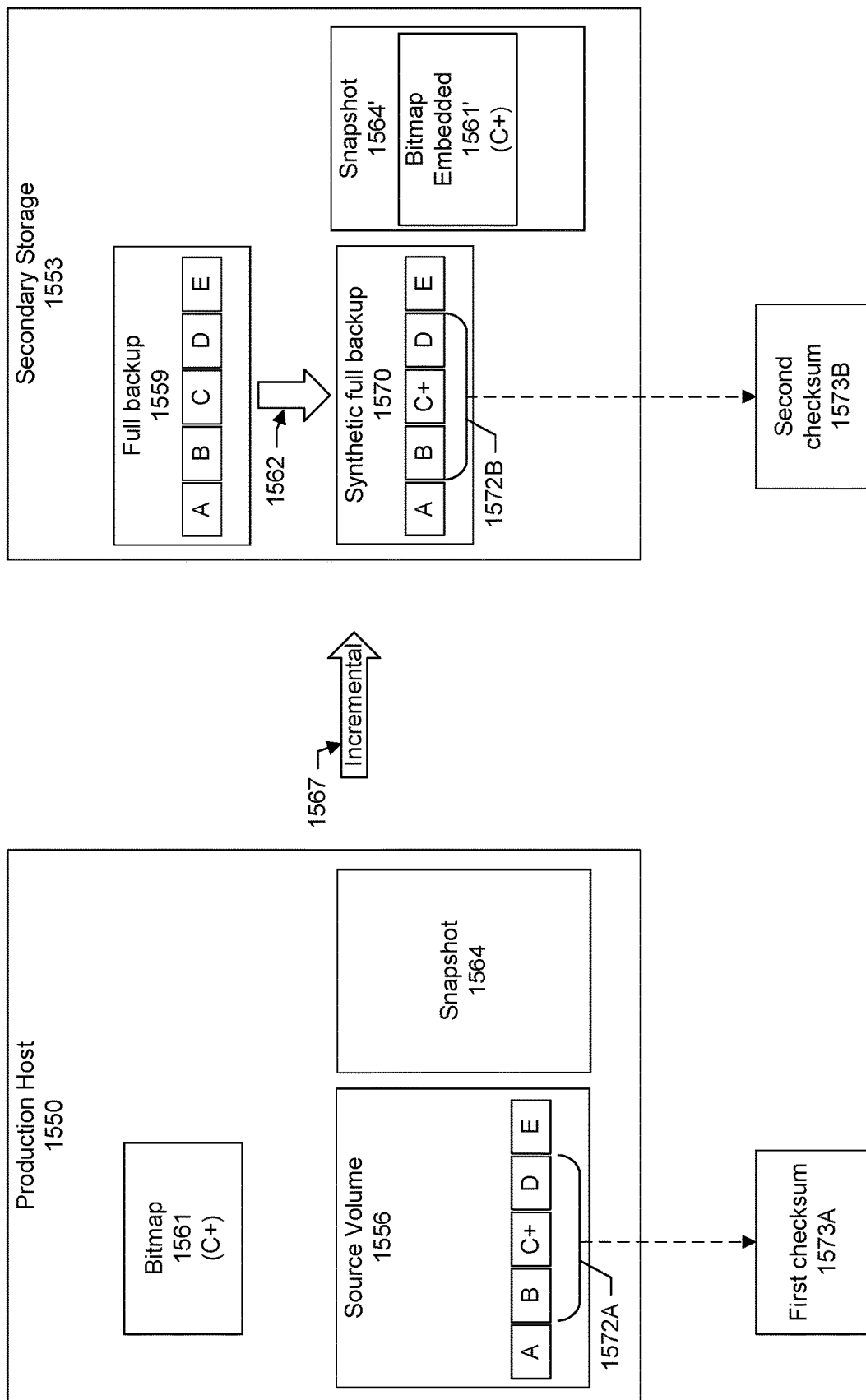
FIG. 15A shows another example of a block diagram for validating a synthetic full backup, according to one or more embodiments.

For example, FIG. 15A shows a block diagram of an example where areas surrounding a location having changes are examined in order to provide additional validation of the backup copy. FIG. 15A is similar to FIG. 14A. For example, FIG. 15A shows a production host 1550 and secondary storage 1553. The production host accesses a source volume 1556 storing production data. Secondary storage stores a full backup 1559 of the source volume. In the example shown in FIG. 15A, the source volume is shown at a current time and the full backup corresponds to a state of the source volume at a previous time of a last backup. The full backup is shown as having blocks A, B, C, D, and E. A bitmap 1561 at the production host has tracked changes since the last backup. The bitmap indicates that block C has changed as shown by a "+" symbol added to block C in the figure.

At the current time, a snapshot 1564 is taken of the source volume. The bitmap is examined in order to identify the changes and conduct an incremental backup 1567 of the source volume to secondary storage. According to the bitmap, a location on the source volume corresponding to block C has changed, e.g., C+. Block C+ is therefore copied to secondary storage during the incremental backup. The bitmap has been embedded into the snapshot and copied to secondary storage, see, e.g., snapshot 1564' and embedded bitmap 1561'. In the example shown in FIG. 15A, the incremental backup operation was accompanied by an on the fly merging 1562 (e.g., during runtime execution of the backup operation) of the incremental backup into the previous full backup to create a synthetic full backup 1570 on secondary storage. In an embodiment, creating the synthetic full backup includes reading unchanged blocks from the full backup, receiving changed blocks from the production host, and writing the blocks to their proper locations in the synthetic full backup.

In the example shown in FIG. 15A, however, a span of blocks that is examined includes blocks at a location the bitmap had indicated changed and blocks before and after the location that were not indicated as having changed. For example, in FIG. 15A, first data of a first span of blocks 1572A is read from the source volume. The first span of blocks includes blocks at the location indicated by the bitmap as having changed (e.g., block C+), blocks immediately before the location (e.g., block B), and blocks immediately after the location (e.g., block D). A first checksum 1573A is calculated based on the first data.

Likewise, second data of a second span of blocks 1572B is read from the synthetic full backup. The second span of blocks includes blocks at the same corresponding location as the source volume. Thus, the second span of blocks includes blocks at the location indicated by the bitmap has having changed (e.g., block C+), blocks immediately before the location (e.g., block B), and blocks immediately after the location (e.g., block D). A second checksum 1573B is calculated based on the second data.

The first and second checksums are checked against each other to determine whether or not the correct data was written to the correct corresponding locations when generating the synthetic full backup. A mismatch of checksums indicates a problem with the backup operation and triggers an alert notification.

The backup validator may be configured to examine any number of blocks in the immediately surrounding locations indicated by the bitmap as having changes so long as the number of examined blocks are consistent between the source volume and synthetic full backup. For example, the system may be configured to read four blocks before the changed blocks and four blocks after the changed blocks. The system may be configured to read 5 blocks before the changed blocks and 10 blocks after the changed blocks. The system may be configured to read 6 blocks before the changed blocks. The system may be configured to read 6 blocks after the changed blocks.

Instead or additionally, any number of random locations may be selected to read, generate, and compare checksums. Increasing the number of blocks read can provide increasing guarantees of the validity of the backup copy. Each additional read, however, requires additional time and compute resources. In an embodiment, each individual customer can configure a length or span of blocks that are read, number of random locations to read, or both for backup copy validation based on their own needs and available resources. In an embodiment, the system can be configured to base the number of random locations read on a size of a particular backup such that the number of random locations read is proportional to the size of the particular backup. For example, there can be a first number of random locations read when a first backup is of a first size. There can be a second number of random locations read when a second backup is of a second size. If the first size is greater than the second size, the first number of random locations read may be greater than the second number of random locations read. If the second size is greater than the first size, the second number of random locations read may be greater than the first number of random locations read.

Table H below shows a flow for validating a block-based backup (BBB) as an embedded object or entity according to one or more embodiments. In an embodiment, the validation is performed in conjunction with the merging of an incremental backup into a full backup to generate a synthetic full backup.

TABLE H

| Step | Description |
|---|---|
| 1 | Read filesystem metadata of the source. |
| 2 | Read filesystem metadata after merged one. |
| 3 | Compare the checksums. |
| 4 | Read bitmaps from the driver. |
| 5 | Read the surrounding blocks of changed blocks from the source. |
| 6 | After merge, read the surrounding blocks from the destination. |
| 7 | Compare the checksums |
| 8 | After regular intervals during data movement, read source of blocks and compare with destination blocks. This periodic sampling or checking is especially useful for large datasets as continuously computing checksums introduces an impact on the backup window. Therefore, in an embodiment, a technique involves randomly selecting some blocks for checksum comparisons instead of computing checksums of the entire volume. |
| 9 | Store bitmap along with backup |

Table I below shows a flow for validating a file-based backup (FBB) as an embedded object or entity according to one or more embodiments.

TABLE I

| Step | Description |
|---|---|
| 1 | Read files and its metadata from the source and store metadata in a database. |
| 2 | Write to destination and store size and checksum in the database. |
| 3 | Check whether size from source does or does not match size from the destination. Each metadata record includes metadata about the files/folders. |
| 4 | Randomly pick any file or folder, read from the destination, check its checksum, and compare it with stored checksum. |
| 5 | Randomly pick one path, traverse it from metadata to data in destination and validate entire chain along the way. |

Table J below shows a flow for validating application data included in a backup according to one or more embodiments.

TABLE J

| Step | Description |
|---|---|
| 1 | During discovery, discover if any file belongs to any application and if so, mark it in a metadata database. |
| 2 | Discovery can use a registry, VSS writer, or other competent service. |
| 3 | At the end of backup, compile a list of applications and their files along with where these files are stored in the destination. |
| 4 | Invokes the respective applications configured to validate their data. |
| 5 | Alert backup administrator for application validations. |
| 6 | Connect to applications tools for validation scripts. |

Figure 16:
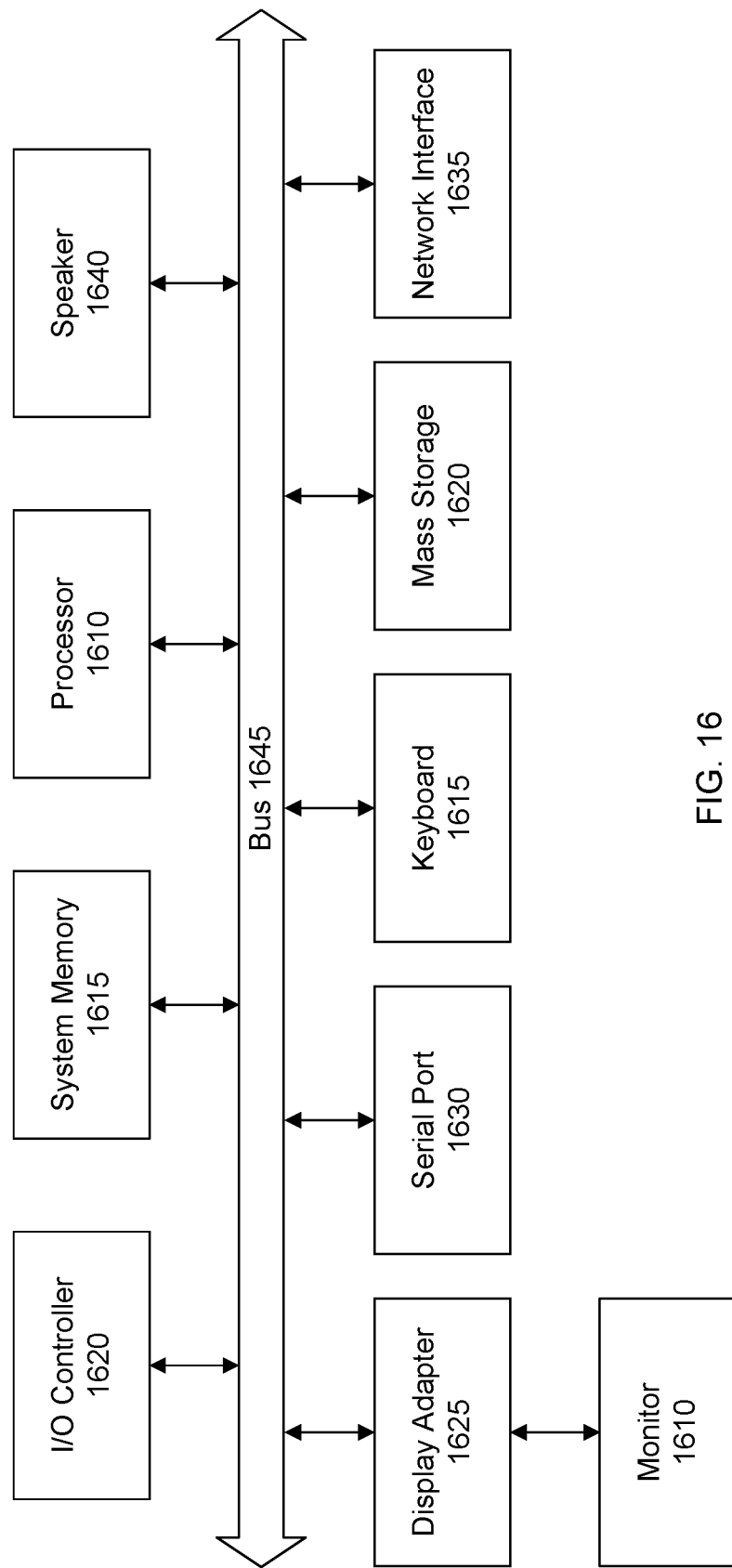
FIG. 16 shows a block diagram of a computer system that may be used to execute code and processes of the system, according to one or more embodiments.

FIG. 16 shows a system block diagram of a computer system used to execute the software of the present system described herein. The computer system 1605 includes a monitor 1610, keyboard 1615, and mass storage devices 1620. Computer system 1605 further includes subsystems such as central processor 1610, system memory 1615, input/output (I/O) controller 1620, display adapter 1625, serial or universal serial bus (USB) port 1630, network interface 1635, and speaker 1640. The system may also be used with computer systems with additional or fewer subsystems. For example, a computer system could include more than one processor 1610 (i.e., a multiprocessor system) or a system may include a cache memory.

Arrows such as 1645 represent the system bus architecture of computer system 1605. However, these arrows are illustrative of any interconnection scheme serving to link the subsystems. For example, speaker 1640 could be connected to the other subsystems through a port or have an internal direct connection to central processor 1610. The processor may include multiple processors or a multicore processor, which may permit parallel processing of information. Computer system 1605 shown in FIG. 16 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, there is a method comprising: tracking, in a bitmap by a changed block tracking (CBT) driver at a production host, changes made to a source volume of the production host since a last backup of the source volume; receiving a command to perform a differential backup of the source volume; issuing a request to a copy service to take a snapshot of the source volume; embedding the bitmap into the snapshot; mounting the snapshot on a backup proxy, different from the production host; retrieving, by the backup proxy, the bitmap from the snapshot; and conducting, by the backup proxy, the differential backup of the source volume to secondary storage, the backup proxy thereby backing up the changes made to the source volume since the last backup according to the bitmap. In an embodiment, the CBT driver is absent from the backup proxy.

In an embodiment, embedding the bitmap into the snapshot further comprises: creating a file in the snapshot at a predetermined path; and writing the bitmap to the file. In an embodiment, the retrieving, by the backup proxy, the bitmap further comprises: traversing the predetermined path on the snapshot to locate the file; and opening the file to access the bitmap.

In an embodiment, the conducting, by the backup proxy, the differential backup of the source volume comprises excluding from the differential backup data on the source volume that has not changed since the last backup according to the bitmap. In an embodiment, the conducting, by the backup proxy, the differential backup further comprises: reading from the snapshot mounted at the backup proxy the changes made to the source volume according to the bitmap; and writing the changes to secondary storage while the production host continues to service production requests.

In an embodiment, there is a system for conducting differential backups from a backup proxy comprising: a processor; and memory configured to store one or more sequences of instructions which, when executed by the processor, cause the processor to carry out the steps of: tracking, in a bitmap by a changed block tracking (CBT) driver at a production host, changes made to a source volume of the production host since a last backup of the source volume; receiving a command to perform a differential backup of the source volume; issuing a request to a copy service to take a snapshot of the source volume; embedding the bitmap into the snapshot; mounting the snapshot on the backup proxy, different from the production host; retrieving, by the backup proxy, the bitmap from the snapshot; and conducting, by the backup proxy, the differential backup of the source volume to secondary storage, the backup proxy thereby backing up the changes made to the source volume since the last backup according to the bitmap.

In an embodiment, there is a computer program product, comprising a non-transitory computer-readable medium having a computer-readable program code embodied therein, the computer-readable program code adapted to be executed by one or more processors to implement a method for conducting differential backups from a backup proxy comprising: tracking, in a bitmap by a changed block tracking (CBT) driver at a production host, changes made to a source volume of the production host since a last backup of the source volume; receiving a command to perform a differential backup of the source volume; issuing a request to a copy service to take a snapshot of the source volume; embedding the bitmap into the snapshot; mounting the snapshot on the backup proxy, different from the production host; retrieving, by the backup proxy, the bitmap from the snapshot; and conducting, by the backup proxy, the differential backup of the source volume to secondary storage, the backup proxy thereby backing up the changes made to the source volume since the last backup according to the bitmap.

In an embodiment, there is a method comprising: retrieving a first synthetic full backup image of a source volume, the first synthetic full backup image having been created from merging a backup chain comprising a first incremental backup image of the source volume into a full backup image of the source volume, the full backup image corresponding to a state of the source volume at a first time, and the first synthetic full backup image corresponding to a state of the source volume at a second time, after the first time; retrieving a first bitmap embedded into a first snapshot of the source volume taken at the second time, the first bitmap identifying data from the source volume copied to secondary storage for creation of the first incremental backup image; and regenerating the backup chain by copying from the first snapshot the data identified by the first bitmap to a first regenerated incremental backup image.

In an embodiment, the first regenerated incremental backup image comprises data backed up from the source volume that changed between the first and second times and excludes data from the source volume that did not change between the first and second times. In an embodiment, the method further comprises: maintaining, with the first snapshot, the first bitmap embedded into the first snapshot. In an embodiment, after creation of the first synthetic full backup image of the source volume, the first incremental backup image of the source volume is no longer available because it has been merged with the full backup image of the source volume.

In an embodiment, the backup chain comprises a plurality of incremental backup images of the source volume, wherein the plurality of incremental backup images are associated with a respective plurality of snapshots of the source volume taken at different times, each snapshot having a bitmap embedded, and wherein each bitmap of a respective snapshot identifies data from the source volume that was to be copied to secondary storage for creation of a respective incremental backup image, and the method further comprises: merging each of the plurality of incremental backup images into the full backup image to create a second synthetic full backup image of the source volume; receiving a request to regenerate the backup chain comprising the plurality of incremental backup images; retrieving a respective bitmap from the respective snapshot; copying from the respective snapshot the data backed up from the source volume and identified by the respective bitmap to a respective regenerated incremental backup image; and repeating the retrieving a respective bitmap and the copying from the respective snapshot until each of the plurality of incremental backup images of the source volume have been regenerated, thereby regenerating the backup chain.

In an embodiment, the method further comprises: after the backup chain has been regenerated, cutting one or more regenerated incremental backup images from the regenerated backup chain; and merging each of one or more regenerated incremental backup images remaining in the regenerated backup chain into the full backup image to create a third synthetic full backup image of the source volume.

In an embodiment, there is a system for backup chain regeneration comprising: a processor; and memory configured to store one or more sequences of instructions which, when executed by the processor, cause the processor to carry out the steps of: retrieving a first synthetic full backup image of a source volume, the first synthetic full backup image having been created from merging a backup chain comprising a first incremental backup image of the source volume into a full backup image of the source volume, the full backup image corresponding to a state of the source volume at a first time, and the first synthetic full backup image corresponding to a state of the source volume at a second time, after the first time; retrieving a first bitmap embedded into a first snapshot of the source volume taken at the second time, the first bitmap identifying data from the source volume copied to secondary storage for creation of the first incremental backup image; and regenerating the backup chain by copying from the first snapshot the data identified by the first bitmap to a first regenerated incremental backup image.

In an embodiment, there is a computer program product, comprising a non-transitory computer-readable medium having a computer-readable program code embodied therein, the computer-readable program code adapted to be executed by one or more processors to implement a method for backup chain regeneration comprising: retrieving a first synthetic full backup image of a source volume, the first synthetic full backup image having been created from merging a backup chain comprising a first incremental backup image of the source volume into a full backup image of the source volume, the full backup image corresponding to a state of the source volume at a first time, and the first synthetic full backup image corresponding to a state of the source volume at a second time, after the first time; retrieving a first bitmap embedded into a first snapshot of the source volume taken at the second time, the first bitmap identifying data from the source volume copied to secondary storage for creation of the first incremental backup image; and regenerating the backup chain by copying from the first snapshot the data identified by the first bitmap to a first regenerated incremental backup image.

In an embodiment, there is a method comprising: receiving a configuration file comprising options for validating backups; issuing a request to a copy service to take a snapshot of a volume to be backed up; determining from the configuration file that a backup of the volume is to be validated; upon the determination, invoking a script comprising code for generating first checksums of data captured by the snapshot; creating a backup copy of the volume using the snapshot; mounting the backup copy; reading the mounted backup copy and generating second checksums of data that has been backed up; allowing the script to compare the first and second checksums; and if any of the first and second checksums do not match, failing the backup copy.

In an embodiment, the options specify a frequency at which the backups should be validated. In an embodiment, the options specify types of backups that should be validated. In an embodiment, the failing the backup copy comprises: marking the backup copy as having failed; and generating an alert to notify a user that the backup of the volume has failed.

In an embodiment, the script is provided by a customer. In an embodiment, the script is provided by a third party.

In an embodiment, there is a system for validating backups comprising: a processor; and memory configured to store one or more sequences of instructions which, when executed by the processor, cause the processor to carry out the steps of: receiving a configuration file comprising options for validating backups; issuing a request to a copy service to take a snapshot of a volume to be backed up; determining from the configuration file that a backup of the volume is to be validated; upon the determination, invoking a script comprising code for generating first checksums of data captured by the snapshot; creating a backup copy of the volume using the snapshot; mounting the backup copy; reading the mounted backup copy and generating second checksums of data that has been backed up; allowing the script to compare the first and second checksums; and if any of the first and second checksums do not match, failing the backup copy.

In an embodiment, there is a computer program product, comprising a non-transitory computer-readable medium having a computer-readable program code embodied therein, the computer-readable program code adapted to be executed by one or more processors to implement a method for validating backups comprising: receiving a configuration file comprising options for validating backups; issuing a request to a copy service to take a snapshot of a volume to be backed up; determining from the configuration file that a backup of the volume is to be validated; upon the determination, invoking a script comprising code for generating first checksums of data captured by the snapshot; creating a backup copy of the volume using the snapshot; mounting the backup copy; reading the mounted backup copy and generating second checksums of data that has been backed up; allowing the script to compare the first and second checksums; and if any of the first and second checksums do not match, failing the backup copy.

In an embodiment, there is a method comprising: retrieving a synthetic full backup of a source volume representing a state of the source volume at a current time, the synthetic full backup having been generated by merging a full backup of the source volume performed at an initial time with an incremental backup of the source volume performed at the current time, after the initial time; accessing a bitmap tracking changes to the source volume made between the initial time and the current time; identifying from the bitmap a location on the source volume comprising changes made between the initial time and the current time; reading first data written to the location on the source volume; reading second data written to the same location on the synthetic full backup; generating a first checksum based on the first data and a second checksum based on the second data; comparing the first and second checksums; and if the first and second checksums do not match, generating an indication that the synthetic full backup is corrupt.

In an embodiment, the reading first data written to the location on the source volume further comprises reading a first span of blocks from the source volume, the first span of blocks comprising blocks before, at, and after the location on the source volume, the first checksum thereby being generated using data from the first span of blocks, and wherein the reading second data written to the same location on the synthetic full backup further comprises reading a second span of blocks from the synthetic full backup, the second span of blocks comprising blocks, before, at, and after the same location on the synthetic full backup, the second checksum thereby being generated using data from the second span of blocks.

In an embodiment, the blocks before and after the location on the source volume have not changed between the initial and current times. In an embodiment, a number of blocks in the first span of blocks is equal to a number of blocks in the second span of blocks. In an embodiment, the first data comprises a first file and the second data comprises a second file.

In an embodiment, the method further comprises: selecting a random location on the source volume; reading third data written to the random location on the source volume; reading fourth data written to the same random location on the synthetic full backup; generating a third checksum based on the third data and a fourth checksum based on the fourth data; comparing the third and fourth checksums; and if the third and fourth checksums do not match, generating the indication that the synthetic full backup is corrupt.

In an embodiment, there is a system for validating backups comprising: a processor; and memory configured to store one or more sequences of instructions which, when executed by the processor, cause the processor to carry out the steps of: retrieving a synthetic full backup of a source volume representing a state of the source volume at a current time, the synthetic full backup having been generated by merging a full backup of the source volume performed at an initial time with an incremental backup of the source volume performed at the current time, after the initial time; accessing a bitmap tracking changes to the source volume made between the initial time and the current time; identifying from the bitmap a location on the source volume comprising changes made between the initial time and the current time; reading first data written to the location on the source volume; reading second data written to the same location on the synthetic full backup; generating a first checksum based on the first data and a second checksum based on the second data; comparing the first and second checksums; and if the first and second checksums do not match, generating an indication that the synthetic full backup is corrupt.

In an embodiment, there is a computer program product, comprising a non-transitory computer-readable medium having a computer-readable program code embodied therein, the computer-readable program code adapted to be executed by one or more processors to implement a method for validating backups comprising: retrieving a synthetic full backup of a source volume representing a state of the source volume at a current time, the synthetic full backup having been generated by merging a full backup of the source volume performed at an initial time with an incremental backup of the source volume performed at the current time, after the initial time; accessing a bitmap tracking changes to the source volume made between the initial time and the current time; identifying from the bitmap a location on the source volume comprising changes made between the initial time and the current time; reading first data written to the location on the source volume; reading second data written to the same location on the synthetic full backup; generating a first checksum based on the first data and a second checksum based on the second data; comparing the first and second checksums; and if the first and second checksums do not match, generating an indication that the synthetic full backup is corrupt.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
providing a writer responsible for embedding bitmaps into snapshots taken by a copy service;
tracking, in a bitmap by a changed block tracking (CBT) driver at a production host, changes made to a source volume of the production host since a last backup of the source volume;
receiving a command to perform a differential backup of the source volume;
issuing a request to the copy service to take a snapshot of the source volume, the snapshot comprising pointers to data on the source volume;
upon receiving a notification from the copy service that the snapshot is to be taken, retrieving, by the writer, the bitmap from the CBT driver;
before the snapshot is made read-only by the copy service, embedding, by the writer, the bitmap into the snapshot;
mounting the snapshot on a backup proxy, different from the production host;
retrieving, by the backup proxy, the bitmap from the snapshot; and
conducting, by the backup proxy, the differential backup of the source volume to secondary storage, the backup proxy thereby backing up the changes made to the source volume since the last backup according to the bitmap.

2. The method of claim 1 wherein the CBT driver is absent from the backup proxy.

3. The method of claim 1 wherein the embedding the bitmap into the snapshot further comprises:
creating a file in the snapshot at a predetermined path; and
writing the bitmap to the file.

4. The method of claim 3 wherein the retrieving, by the backup proxy, the bitmap further comprises:
traversing the predetermined path on the snapshot to locate the file; and
opening the file to access the bitmap.

5. The method of claim 1 wherein the conducting, by the backup proxy, the differential backup of the source volume comprises excluding from the differential backup data on the source volume that has not changed since the last backup according to the bitmap.

6. The method of claim 1 wherein the conducting, by the backup proxy, the differential backup further comprises:

reading from the snapshot mounted at the backup proxy the changes made to the source volume according to the bitmap; and writing the changes to secondary storage while the production host continues to service production requests.

7. A system for conducting differential backups from a backup proxy comprising: a processor; and memory configured to store one or more sequences of instructions which, when executed by the processor, cause the processor to carry out the steps of:

providing a writer responsible for embedding bitmaps into snapshots taken by a copy service;

tracking, in a bitmap by a changed block tracking (CBT) driver at a production host, changes made to a source volume of the production host since a last backup of the source volume;

receiving a command to perform a differential backup of the source volume;

issuing a request to the copy service to take a snapshot of the source volume, the snapshot comprising pointers to data on the source volume;

upon receiving a notification from the copy service that the snapshot is to be taken, retrieving, by the writer, the bitmap from the CBT driver;

before the snapshot is made read-only by the copy service, embedding, by the writer, the bitmap into the snapshot;

mounting the snapshot on the backup proxy, different from the production host;

retrieving, by the backup proxy, the bitmap from the snapshot; and conducting, by the backup proxy, the differential backup of the source volume to secondary storage, the backup proxy thereby backing up the changes made to the source volume since the last backup according to the bitmap.

8. The system of claim 7 wherein the CBT driver is absent from the backup proxy.

9. The system of claim 7 wherein the embedding the bitmap into the snapshot further comprises:

creating a file in the snapshot at a predetermined path; and writing the bitmap to the file.

10. The system of claim 9 wherein the retrieving, by the backup proxy, the bitmap further comprises:

traversing the predetermined path on the snapshot to locate the file; and opening the file to access the bitmap.

11. The system of claim 7 wherein the conducting, by the backup proxy, the differential backup of the source volume comprises excluding from the differential backup data on the source volume that has not changed since the last backup according to the bitmap.

12. The system of claim 7 wherein the conducting, by the backup proxy, the differential backup further comprises:

reading from the snapshot mounted at the backup proxy the changes made to the source volume according to the bitmap; and writing the changes to secondary storage while the production host continues to service production requests.

13. A computer program product, comprising a non-transitory computer-readable medium having a computer-readable program code embodied therein, the computer-readable program code adapted to be executed by one or more processors to implement a method for conducting differential backups from a backup proxy comprising:

providing a writer responsible for embedding bitmaps into snapshots taken by a copy service;

tracking, in a bitmap by a changed block tracking (CBT) driver at a production host, changes made to a source volume of the production host since a last backup of the source volume;

receiving a command to perform a differential backup of the source volume;

issuing a request to the copy service to take a snapshot of the source volume, the snapshot comprising pointers to data on the source volume;

upon receiving a notification from the copy service that the snapshot is to be taken, retrieving, by the writer, the bitmap from the CBT driver;

before the snapshot is made read-only by the copy service, embedding, by the writer, the bitmap into the snapshot;

mounting the snapshot on the backup proxy, different from the production host;

retrieving, by the backup proxy, the bitmap from the snapshot; and conducting, by the backup proxy, the differential backup of the source volume to secondary storage, the backup proxy thereby backing up the changes made to the source volume since the last backup according to the bitmap.

14. The computer program product of claim 13 wherein the CBT driver is absent from the backup proxy.

15. The computer program product of claim 13 wherein the embedding the bitmap into the snapshot further comprises:

creating a file in the snapshot at a predetermined path; and writing the bitmap to the file.

16. The computer program product of claim 15 wherein the retrieving, by the backup proxy, the bitmap further comprises:

traversing the predetermined path on the snapshot to locate the file; and opening the file to access the bitmap.

17. The computer program product of claim 13 wherein the conducting, by the backup proxy, the differential backup of the source volume comprises excluding from the differential backup data on the source volume that has not changed since the last backup according to the bitmap.

18. The computer program product of claim 13 wherein the conducting, by the backup proxy, the differential backup further comprises:

reading from the snapshot mounted at the backup proxy the changes made to the source volume according to the bitmap; and writing the changes to secondary storage while the production host continues to service production requests.

19. The method of claim 1 further comprising after the differential backup has completed, maintaining the bitmap embedded in the snapshot.

* * * * *